US011658713B2

(12) United States Patent
Lee et al.

(10) Patent No.: US 11,658,713 B2
(45) Date of Patent: May 23, 2023

(54) APPARATUS AND METHOD FOR NON-ORTHOGONAL MULTIPLE ACCESS IN WIRELESS COMMUNICATION SYSTEM

(71) Applicants: Samsung Electronics Co., Ltd., Suwon-si (KR); Korea University Research and Business Foundation, Seoul (KR)

(72) Inventors: Byungju Lee, Suwon-si (KR); Chung Gu Kang, Seoul (KR); Ameha Tsegaye Abebe, Seoul (KR); Hyojin Lee, Suwon-si (KR)

(73) Assignees: Samsung Electronics Co., Ltd., Suwon-si (KR); Korea University Research & Business Foundation, Seoul (KR)

( * ) Notice: Subject to any disclaimer, the term of this patent is extended or adjusted under 35 U.S.C. 154(b) by 0 days.

(21) Appl. No.: 17/070,807

(22) Filed: Oct. 14, 2020

(65) Prior Publication Data
US 2021/0111772 A1 Apr. 15, 2021

(30) Foreign Application Priority Data
Oct. 15, 2019 (KR) ........................ 10-2019-0128061

(51) Int. Cl.
*H04B 7/0456* (2017.01)
*H04W 76/27* (2018.01)
*H04B 7/216* (2006.01)

(52) U.S. Cl.
CPC ........... *H04B 7/0482* (2013.01); *H04B 7/216* (2013.01); *H04W 76/27* (2018.02)

(58) Field of Classification Search
CPC ... H04L 5/0037; H04L 1/0041; H04L 1/0045; H04L 1/0047; H04L 1/0048; H04J 13/16;
(Continued)

(56) References Cited

U.S. PATENT DOCUMENTS 9,768,839 B2    9/2017  Vilaipornsawai et al.
10,623,069 B2 *  4/2020  Bayesteh ............. H04B 7/0669
(Continued)

FOREIGN PATENT DOCUMENTS

KR    10-2017-0056670 A    5/2017
KR    10-2018-0072886 A    6/2018
KR    10-1882464 B1    7/2018

*Primary Examiner* — Sophia Vlahos

(57) ABSTRACT

The disclosure relates to a communication technique of combining a 5G communication system to support a higher data transfer rate than in a 4G system with IoT technology, and a system thereof. The disclosure provides a terminal in a wireless communication system. The terminal includes at least one processor configured to: obtain a codebook set for the terminal; generate uplink signals by using a plurality of codebooks of the codebook set; and control at least one transceiver to transmit the uplink signals to a base station. A first uplink signal of a first resource among the uplink signals is generated based on a codeword of a first codebook among codebooks and a second uplink signal of a second resource adjacent to the first resource among the uplink signals is generated based on a codeword of a second codebook which is different from the first codebook among codebooks.

15 Claims, 19 Drawing Sheets

(58) Field of Classification Search
CPC ......... H04J 11/003; H04B 7/216; H04B 7/06; H04B 7/0452; H04B 7/0482; H04W 76/27
See application file for complete search history.

(56) References Cited

U.S. PATENT DOCUMENTS

| | | | |
|---|---|---|---|
| 2010/0322331 A1* | 12/2010 | Sun | H04B 7/0626 375/260 |
| 2016/0286529 A1 | 9/2016 | Ma et al. | |
| 2017/0117986 A1* | 4/2017 | Perotti | H04W 28/0236 |
| 2018/0278303 A1* | 9/2018 | Hong | H04L 5/0016 |
| 2019/0238196 A1* | 8/2019 | Lei | H04J 11/004 |
| 2020/0163058 A1* | 5/2020 | Lee | H04W 72/082 |

* cited by examiner

APPARATUS AND METHOD FOR NON-ORTHOGONAL MULTIPLE ACCESS IN WIRELESS COMMUNICATION SYSTEM

CROSS-REFERENCE TO RELATED APPLICATION

This application is based on and claims priority under 35 U.S.C. § 119 to Korean Patent Application No. 10-2019-0128061 filed on Oct. 15, 2019 in the Korean Intellectual Property Office, the disclosure of which is herein incorporated by reference in its entirety.

BACKGROUND

1. Field

The disclosure generally relates to a wireless communication system, and more particularly, to an apparatus and a method for non-orthogonal multiple excess in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The NOMA, which is a method for transmitting through radio resources that do not meet orthogonality to increase a transmission capacity, is being introduced as next generation technology. A method of using a codebook as a signature for distinguishing users in radio resources to effectively perform the NOMA is considered.

The above information is presented as background information only to assist with an understanding of the disclosure. No determination has been made, and no assertion is made, as to whether any of the above might be applicable as prior art with regard to the disclosure.

SUMMARY

Based on the above-described discussion, the disclosure provides an apparatus and a method for performing NOMA using multiple codebooks (hereinafter, multiple codebooks-based NOMA) in a wireless communication system.

In addition, the disclosure provides an apparatus and a method for designing multiple codebooks in a wireless communication system to efficiently communicate in a NOMA system.

In addition, the disclosure provides an apparatus and a method for signaling configuration information of multiple codebooks-based NOMA in a wireless communication system.

In addition, the disclosure provides an apparatus and a method for distinguishing signals of respective terminals among signals transmitted according a multiple codebooks-based NOMA technique in a wireless communication system.

According to various embodiments of the disclosure, an operating method of a terminal for non-orthogonal multiple access (NOMA) in a wireless communication system may include: obtaining a codebook set for the terminal; generating uplink signals by using a plurality of codebooks of the codebook set; and transmitting the uplink signals to a base station, and a first uplink signal of a first resource among the uplink signals may be generated based on a codeword of a first codebook among the plurality of codebooks, a second uplink signal of a second resource adjacent to the first resource among the uplink signals may be generated based on a codeword of a second codebook which is different from the first codebook among the plurality of codebooks.

According to various embodiments of the disclosure, an operating method of a base station for NOMA in a wireless communication system may include: obtaining an entire codebook set for a plurality of terminals; receiving a first overlapping signal in which signals of the plurality of terminals overlap one another in a first resource; receiving a second overlapping signal in which the signals of the plurality of terminals overlap one another in a second resource; detecting a first uplink signal of a terminal in the first resource, based on a codebook set for the terminal; and detecting a second uplink signal of the terminal in the second resource, based on the codebook set, and the codebook set may include a plurality of codebooks in the entire codebook set, the first uplink signal may be generated based on a codeword of a first codebook among the plurality of codebooks, and the second uplink signal of the second resource may be generated based on a codeword of a second codebook which is different from the first codebook among the plurality of codebooks.

According to various embodiments of the disclosure, a terminal for NOMA in a wireless communication system may include: at least one transceiver; and at least one processor coupled with the at least one transceiver, and the at least one processor may be configured to: obtain a codebook set for the terminal; generate uplink signals by using a plurality of codebooks of the codebook set; and control the at least one transceiver to transmit the uplink signals to a base station, and wherein a first uplink signal of a first resource among the uplink signals may be generated based on a codeword of a first codebook among the plurality of codebooks, and a second uplink signal of a second resource adjacent to the first resource among the uplink signals may be generated based on a codeword of a second codebook which is different from the first codebook among the plurality of codebooks.

According to various embodiments, a base station for NOMA in a wireless communication system may include: at least one transceiver; and at least one processor coupled with the at least one transceiver, and the at least one processor may be configured to: obtain an entire codebook set for a plurality of terminals; control the at least one transceiver to receive a first overlapping signal in which signals of the plurality of terminals overlap one another in a first resource; control the at least one transceiver to receive a second overlapping signal in which the signals of the plurality of terminals overlap one another in a second resource; detect a first uplink signal of a terminal in the first resource, based on a codebook set for the terminal; and detect a second uplink signal of the terminal in the second resource, based on the codebook set, and the codebook set may include a plurality of codebooks in the entire codebook set, the first uplink signal may be generated based on a codeword of a first codebook among the plurality of codebooks, and the second uplink signal of the second resource may be generated based on a codeword of a second codebook which is different from the first codebook among the plurality of codebooks.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
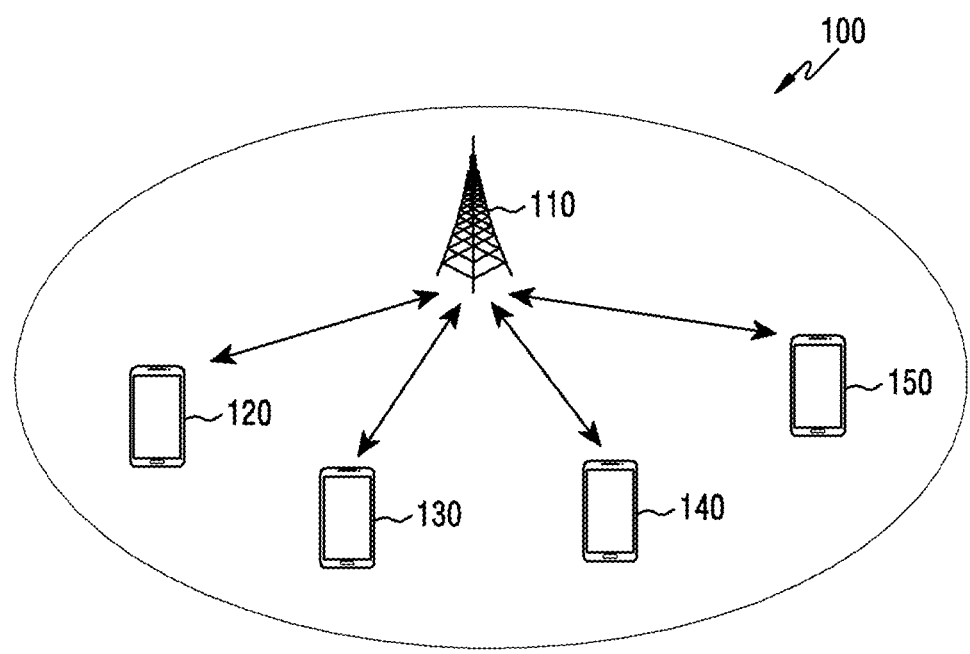
FIG. 1 is a view illustrating a wireless communication system according to various embodiments of the disclosure.

FIGS. 1 through 14C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the disclosure are used to describe specified embodiments and are not intended to limit the scope of other embodiments. The terms of a singular form may include plural forms unless otherwise specified. Unless otherwise defined herein, all the terms used herein, which include technical or scientific terms, may have the same meanings that are generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the disclosure. In some cases, even if terms are terms which are defined in the disclosure, they may not be interpreted to exclude embodiments of the disclosure.

In various embodiments of the disclosure which will be described hereinbelow, a hardware-level approach method will be described by way of an example. However, since various embodiments of the disclosure include technology using both hardware and software, various embodiments of the disclosure do not exclude software-based approach methods.

In the following descriptions, the term indicating a signal (for example, a message, information, a preamble, a signal, signaling, a sequence, a stream), the term indicating resources (for example, a symbol, a slot, a subframe, a radio frame, a subcarrier, a resource element (RE), a resource block (RB), a bandwidth part (BWP), an occasion), the term indicating a calculation state (for example, a step, an operation, a procedure), the term indicating data (for example, information, a bit, a symbol, a codeword), the term indicating a channel, the term indicating control information (for example, downlink control information (DCI), a medium access control element (MAC CE), radio resource control (RRC) signaling, network entities), the term indicating network entities, the term indicating a components of an apparatus are exemplified for convenience of explanation. Accordingly, the disclosure is not limited to the terms which will be described below, and other terms having the same technical meanings may be used.

In addition, in the disclosure, the expression "exceed" or "less than" is used to determine whether a specific condition is satisfied or fulfilled. However, this expression is just used to express an example and does not preclude the expression "greater than or equal to" or "less than or equal to." The expression "greater than or equal to" may be substituted with "exceed," the expression "less than or equal to" may be substituted with "less than," and the expression "greater than or equal to and is less than . . . " may be substituted with "exceed and is less than or equal to."

In addition, various embodiments of the disclosure will be described by using terms used in some communication standards (for example, $3^{rd}$ generation partnership project (3GPP)). However, the terms are merely examples for explanation. Various embodiments of the disclosure may be easily changed and applied to other communication systems.

The disclosure relates to non-orthogonal multiple access (NOMA) in wireless communication, and in particular, relates to an apparatus, a method, and a system for multiple codebooks NOMA. The NOMA is considered as a communication technique for increasing a system capacity by using radio resources even if orthogonality of radio resources is not satisfied. As a technique for NOMA, a method of using a codebook in sparse code multiple access (SCMA), pattern division multiple access (PDMA), etc., that is, a codebook-based NOMA method, was suggested. However, in the case of the related-art codebook-based NOMA method, a user uses a single codebook for all transmission blocks, and therefore, performance may be degraded when a channel condition is unfavorably applied to a corresponding codebook. If a single codebook is used, a plurality of codewords in a system where a codeword is mapped onto an adjacent subcarrier (for example, orthogonal frequency division multiplexing (OFDM)) may be continuously transmitted in a poor channel state.

To solve this problem, various embodiments of the disclosure suggest a multiple codebooks-based NOMA method (hereinafter, MC-NOMA) which uses a plurality of codebooks rather than a single codebook. In particular, various embodiments of the disclosure suggest a method for more efficiently managing multiple codebooks. Hereinbelow, as a codebook-based NOMA method, SCMA using a plurality of codebooks (that is, MC-SCMA) or PDMA using a plurality of codebooks (that is, MC-PDMA) will be described by way of an example, but other NOMA techniques using multiple codebooks may be used.

FIG. 1 illustrates a wireless communication system according to various embodiments of the disclosure. FIG. 1 illustrates a base station 110, a terminal 120, a terminal 130, a terminal 140, a terminal 150 as some of nodes using wireless channels in a wireless communication system. Although FIG. 1 illustrates only one base station, other base stations which are the same as or similar to the base station 110 may further be included.

The base station 110 is a network infrastructure that provides wireless access to the terminals 120, 130, 140, 150. The base station 110 has a coverage that is defined as a predetermined geographic region based on a distance by which a signal can be transmitted. The base station 110 may be indicated by the terms "access point (AP)," "eNodeB (eNB)," "$5^{th}$ generation (5G) node," "next generation nodeB (gNB)", "5G nodeB (5gNB)," "wireless point," "transmission/reception point (TRP)," "digital unit (DU)," "radio unit (RU)," "remote radio head (RRH)," or other terms having the same technical meaning as the above-mentioned terms, in addition to the term "base station."

Each of the terminal 120, the terminal 130, the terminal 140, and the terminal 150 is a device which is used by a user, and communicates with the base station 110 through a wireless channel. In some cases, at least one of the terminal 120, the terminal 130, the terminal 140, and the terminal 150 may be managed without intervention of a user. That is, at least one of the terminal 120, the terminal 130, the terminal 140, and the terminal 150 may be a device which performs machine type communication (MTC), and may not be carried by a user. Each of the terminal 120, the terminal 130, the terminal 140, and the terminal 150 may be indicated by the terms "user equipment (UE)," "mobile station," "subscriber station," "remote terminal," "wireless terminal," "electronic device," or "user device," or other terms having the same technical meanings as the above-mentioned terms, in addition to the term "terminal." For example, the terminal (for example, the terminal 120) according to various embodiments of the disclosure may include, for example, at least one of a cellular phone, a smartphone, a computer, a tablet personal computer (PC), a mobile phone, a video phone, an e-book reader device, a desktop PC, a laptop PC, a netbook computer, a workstation, a server, a personal digital assistant (PDA), a portable multimedia player (PMP), an MP3 player, a medical device, a camera, a wearable device, or a multimedia system capable of performing a communication function. In addition, the type of the terminal is not limited to the above-described examples, and a description of the terminal is described with reference to the terminal 120, but is applicable to the terminal 130, the terminal 140, the terminal 150.

The base station 110, the terminal 120, the terminal 130, the terminal 140, the terminal 150 may perform beamforming to enhance a channel gain. Herein, beamforming may include transmission beamforming and reception beamforming. That is, the base station 110, the terminal 120, the terminal 130, the terminal 140, and the terminal 150 may give directivity to a transmission signal or a reception signal. To achieve this, the base station 110 and the terminals 120, 130 may select serving beams through a beam search or beam management procedure. After the serving beams are selected, communication may be performed through resources having a quasi co-located (QCL) relationship with resources having transmitted serving beams. For example, at least some of the terminal 120, the terminal 130, the terminal 140, and the terminal 150, and the base station 110 may transmit and receive wireless signals in a millimeter wave (mmWave) band (for example, 28 GHz, 30 GHz, 38 GHz, 60 GHz).

If large-scale characteristics of a channel which has transmitted a symbol on a first antenna port can be inferred from a channel which has transmitted a symbol on a second antenna port, the first antenna port and the second antenna port may be estimated as having a QCL relationship. For example, large-scale characteristics may include at least one of delay spread, doppler spread, doppler shift, average gain, average delay, spatial receiver parameter.

The terminal 120 may perform a synchronization process and a cell discovery procedure through a primary synchronization signal (PSS), a secondary synchronization signal (SSS), a physical broadcast channel (PBCH). Thereafter, the terminal 120 may perform an access procedure to complete access to a network through the base station 110. The terminal 120 may transmit a preamble through a physical random access channel (PRACH), and may receive a response message to the preamble through a physical downlink control channel (PDCCH) and a physical downlink shared channel (PDSCH). After performing the above-described procedure, the terminal may perform PDCCH/PDSCH reception and physical uplink shared channel (PUSCH)/physical uplink control channel (PUCCH) transmission as a normal uplink/downlink signal transmission procedure. This access procedure may be used for various purposes such as initial access, uplink synchronization adjustment, resource allocation, handover, etc.

The NOMA is introduced as a main technique for increasing transmission efficiency by overlapping signals of a plurality of users on the same time-frequency resource to enhance a cell capacity. The NOMA is an access method for allowing signals to be received and transmitted even when the same time-frequency resources are used, that is, when orthogonality of transmission resources between user terminals is not satisfied. The cell capacity can be increased by overlapping a plurality of signals and using sequential interference removal, instead of satisfying the orthogonality which is the principle of a related-art orthogonal multiple access method. Accordingly, each of the terminal 120, the terminal 130, the terminal 140, and the terminal 150 may communicate with the base station 110 through the NOMA technique to increase the capacity of a cell of the base station 110. Even when the terminal 120, the terminal 130, the terminal 140, the terminal 150 transmits signals through the same time-frequency resource, the base station 110 may detect and obtain signals of the respective terminals effectively through the NOMA technique according to various embodiments of the disclosure.

Hereinafter, NOMA in a case where respective terminals transmit uplink signals to a base station through the same resource (time-frequency resource) according to various embodiments of the disclosure will be described. For example, a case where a terminal performs procedures to access a base station (for example, a random access procedure) will be described. However, the case where the plurality of terminals transmit uplink signals to the base station, respectively, is merely an example for explaining the NOMA technique according to various embodiments of the disclosure, and the disclosure is not limited thereto. Various embodiments of the disclosure are applicable to downlink transmission as well as uplink transmission.

Figure 2:
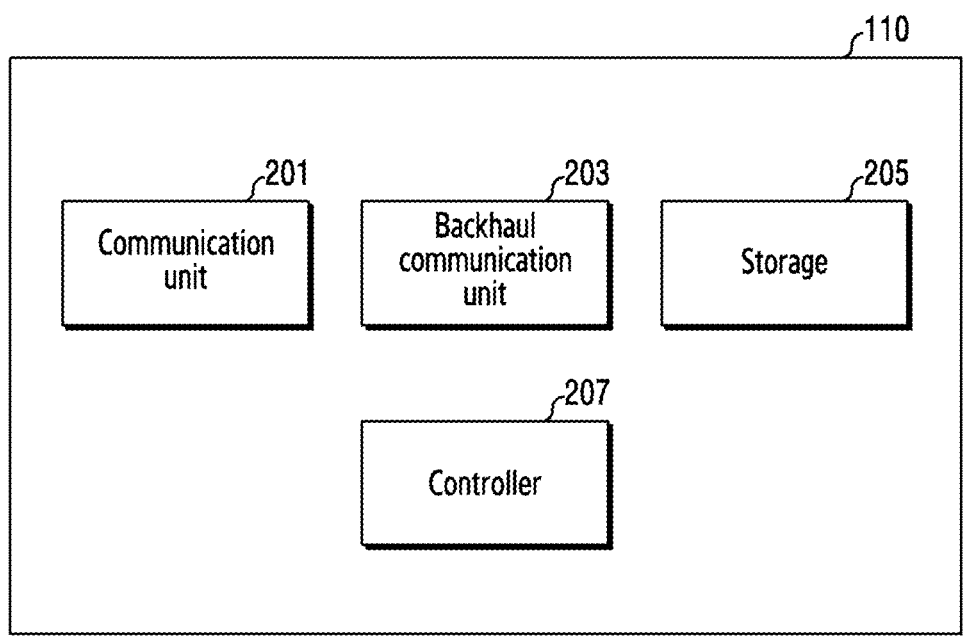
FIG. 2 is a view illustrating a configuration of a base station according to various embodiments of the disclosure.

FIG. 2 illustrates a configuration of a base station according to various embodiments of the disclosure. The configuration illustrated in FIG. 2 may be understood as a configuration of the base station 110. The term "unit" or terms ending with suffixes "-er," and "-or" used in the following description refer to a unit processing at least one function or operation, and may be implemented by hardware, software, or a combination of hardware and software.

Referring to FIG. 2, the base station 110 may include a wireless communication unit 201, a backhaul communication unit 203, a storage 205, and a controller 207.

The wireless communication unit 201 performs functions for transmitting and receiving signals via a wireless channel. For example, the wireless communication unit 201 may perform a function of converting between a baseband signal and a bit stream according to a physical layer standard of a system. For example, when transmitting data, the wireless communication unit 201 may generate complex symbols by encoding and modulating a transmission bit stream. In addition, when receiving data, the wireless communication unit 201 may restore a reception bit stream by demodulating and decoding a baseband signal. In addition, the wireless communication unit 201 may up-convert a baseband signal into a radio frequency (RF) band signal, and then may transmit the signal via an antenna, and may down-convert an RF band signal received via an antenna into a baseband signal.

To achieve this, the wireless communication unit 201 may include a transmission filter, a reception filter, an amplifier, a mixer, an oscillator, a digital to analog converter (DAC), an analog to digital converter (ADC), or the like. In addition, the wireless communication unit 201 may include a plurality of transmission and reception paths. Furthermore, the wireless communication unit 201 may include at least one antenna array including a plurality of antenna elements. From a hardware aspect, the wireless communication unit 201 may include a digital unit and an analog unit, and the analog unit may include a plurality of sub-units according to operating power, an operating frequency, or the like.

The wireless communication unit 201 may transmit and receive signals. To achieve this, the wireless communication unit 201 may include at least one transceiver. For example, the wireless communication unit 201 may transmit a synchronization signal, a reference signal, system information, a message, control information, or data. In addition, the wireless communication unit 201 may perform beamforming.

The wireless communication unit 201 transmits and receives signals as described above. Accordingly, an entirety or a portion of the wireless communication unit 201 may be referred to as a "transmitter," "receiver," or "transceiver." In addition, in the following description, transmitting and receiving via a wireless channel may be used as a meaning including processing by the wireless communication unit 201 as described above.

The backhaul communication unit 203 provides an interface for communicating with the other nodes in the network. That is, the backhaul communication unit 203 may convert a bit stream to be transmitted from the base station 110 to another node, for example, another access node, another base station, an upper node, a core network, or the like, into a physical signal, and may convert a physical signal transmitted from another node into a bit stream.

The storage 205 stores data such as a basic program for the operation of the base station 110, an application program, configuration information, or the like. The storage 205 may include a memory. The storage 205 may be configured with a volatile memory, a nonvolatile memory, or a combination of a volatile memory and a nonvolatile memory. In addition, the storage 205 provides stored data according to a request of the controller 207. According to an embodiment, the storage 205 may store a codebook set including a plurality of codebooks for the NOMA technique. In addition, the storage 205 may store one or more codebook sets in the unit of groups of terminals.

The controller 207 controls overall operations of the base station 110. For example, the controller 207 transmits and receives a signal through the wireless communication unit 201 or the backhaul communication unit 203. In addition, the controller 207 writes and reads data on and from the storage 205. In addition, the controller 207 may perform functions of a protocol stack required by communication standards. To achieve this, the controller 207 may include at least one processor. In some embodiments, the controller 207 may include a codebook configuration unit. The codebook configuration unit may configure a codebook set to be applied to each of terminals to perform the multiple codebooks-based NOMA. In addition, according to various embodiments, the controller 207 may include a detection unit. The detection unit may detect signals of respective terminals in sequence from a plurality of signals transmitted through the same time-frequency resource based on a plurality of codebooks. The codebook configuration unit and the detection unit may be a storage space that stores an instruction/code at least temporarily resided in the controller 207 as an instruction set or a code stored in the storage 205, or a portion of a circuitry constituting the controller 207. According to various embodiments, the controller 207 may control the base station 110 to perform operations according to various embodiments, which will be described below.

The configuration of the base station 110 illustrated in FIG. 2 is merely an example of the base station, and an example of the base station performing various embodiments of the disclosure is not limited to the configuration illustrated in FIG. 2. That is, some components may be added, deleted, or changed according to various embodiments.

The base station is described as one entity in FIG. 2, but the disclosure is not limited thereto. The base station according to various embodiments of the disclosure may be implemented to form an access network having not only an integrated deployment but also a distributed deployment. According to an embodiment, the base station may be divided into a central unit (CU) and a digital unit (DU), and the CU may be implemented to perform an upper layer function (for example, a packet data convergence protocol (PDCP), and the DU may be implemented to perform a lower layer function (for example, a medium access control (MAC), physical (PHY)). The DU of the base station may form a beam coverage on a wireless channel.

Figure 3:
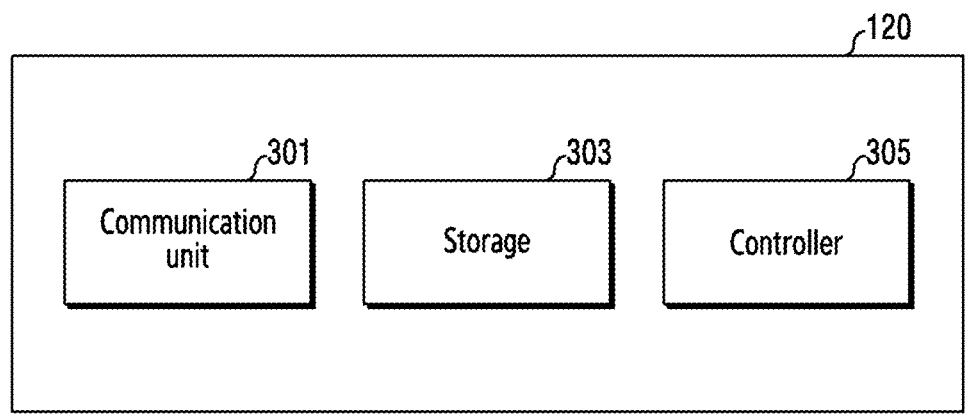
FIG. 3 is a view illustrating a configuration of a terminal according to various embodiments of the disclosure.

FIG. 3 illustrates a configuration of a terminal according to various embodiments of the disclosure. The configuration illustrated in FIG. 3 may be understood as a configuration of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal 120 may include a communication unit 301, a storage 303, and a controller 305.

The communication unit 301 performs functions for transmitting and receiving signals via a wireless channel. For example, the communication unit 301 may perform a function of converting between a baseband signal and a bit stream according to a physical layer standard of a system. For example, when transmitting data, the communication unit 301 may generate complex symbols by encoding and modulating a transmission bit stream. In addition, when receiving data, the communication unit 301 may restore a reception bit stream by demodulating and decoding a baseband signal. In addition, the communication unit 301 may up-convert a baseband signal into an RF band signal, and then may transmit the signal via an antenna, and may down-convert an RF band signal received via an antenna into a baseband signal. For example, the communication unit 301 may include a transmission filter, a reception filter, an amplifier, a mixer, an oscillator, a DAC, an ADC, or the like. According to various embodiments, the communication unit 301 may apply a signature (for example, a codeword, a sequence, a pattern, etc.) for identifying a specific terminal in corresponding resources, and may transmit signals even if orthogonality between resources is not satisfied (for example, signals of a plurality of terminals overlap one another in the same time-frequency resource). In some embodiments, according to SCMA, the communication unit 301 may transmit uplink signals based on codes as defined in a codebook. In some other embodiments, according to PDMA, the communication unit 301 may transmit uplink signals based on patterns as defined in a codebook.

In addition, the communication unit 301 may include a plurality of transmission and reception paths. Furthermore, the communication unit 301 may include an antenna unit. The communication unit 301 may include at least one antenna array including a plurality of antenna elements. From a hardware aspect, the communication unit 301 may include a digital circuit and an analog circuit (for example, a radio frequency integrated circuit (RFIC)). Herein, the digital circuit and the analogue circuit may be implemented as a single package. In addition, the communication unit 301 may include a plurality of RF chains. The communication unit 301 may perform beamforming. The communication unit 301 may apply a beamforming weight to a signal to be transmitted and received to give directivity to the signal according to setting of the controller 305. According to an embodiment, the communication unit 301 may include a radio frequency (RF) block (or an RF unit). The RF block may include a first RF circuitry related to an antenna, and a second RF circuitry related to baseband processing. The first RF circuitry may be referred to as an RF-antenna (RF-A). The second RF circuitry may be referred to as an RF-baseband (RF-B).

In addition, the communication unit 301 may transmit and receive signals. To achieve this, the communication unit 301 may include at least one transceiver. The communication unit 301 may receive a downlink signal. The downlink signal may include a synchronization signal (SS), a reference signal (RS) (for example, a cell-specific reference signal (CRS), a demodulation reference signal (DM-RS)), system information (for example, a master information block (MIB), a system information block (SIB), remaining system information (RMSI), other system information (OSI)), a configuration message, control information, or downlink data, etc. In addition, the communication unit 301 may transmit an uplink signal. The uplink signal may include a random access-related signal (for example, a random access preamble (RAP) (or Msg1 (message 1)), Msg3 (message 3)), a reference signal (for example, a sounding reference signal (SRS), a DM-RS), or a power headroom report (PHR), etc.

In addition, the communication unit 301 may include different communication modules to process signals of different frequency bands. Furthermore, the communication unit 3001 may include a plurality of communication modules to support a plurality of different wireless access techniques. For example, the different wireless access techniques may include Bluetooth low energy (BLE), wireless fidelity (Wi-Fi), WiFi gigabyte (WiGig), a cellular network (for example, long term evolution (LTE), new radio (NR)), etc. In addition, the different frequency bands may include a super high frequency (SHF) (for example, 2.5 GHz, 5 GHz) band, a millimeter wave (for example, 38 GHz, 60 GHz, etc.) band. In addition, the communication unit 301 may use a wireless access technique of the same method on an unlicensed band for different frequency bands (for example, licensed assisted access (LAA)), a citizens broadband radio service (CBRS) (for example, 3.5 GHz).

The communication unit 301 may transmit and receive signals as described above. Accordingly, an entirety or a portion of the communication unit 301 may be referred to as a "transmitter," "receiver," or "transceiver." In addition, in the following description, transmitting and receiving via a wireless channel may be used as a meaning including processing by the communication unit 301 as described above.

The storage 303 may store data such as a basic program for the operation of the terminal 120, an application program, configuration information, or the like. The storage 303 may be configured with a volatile memory, a nonvolatile memory, or a combination of a volatile memory and a nonvolatile memory. In addition, the storage 303 provides stored data according to a request of the controller 305. According to various embodiments, the storage 303 may store a codebook set for an MC-NOMA to be managed in the terminal 120.

The controller 305 controls overall operations of the terminal 120. For example, the controller 305 transmits and receives signals via the communication unit 301. In addition, the controller 305 writes and reads data on and from the storage 303. In addition, the controller 305 may perform functions of a protocol stack required by communication standards. To achieve this, the controller 305 may include at least one processor. The controller 305 may include at least one processor or a micro processor, or may be a portion of a processor. In addition, a portion of the communication unit 301 and the controller 305 may be referred to as a communication processor (CP). The controller 305 may include various modules to perform communication. According to various embodiments, the controller 305 may control the terminal to perform operations according to various embodiments, which will be described below.

NOMA System Model

Figure 4:
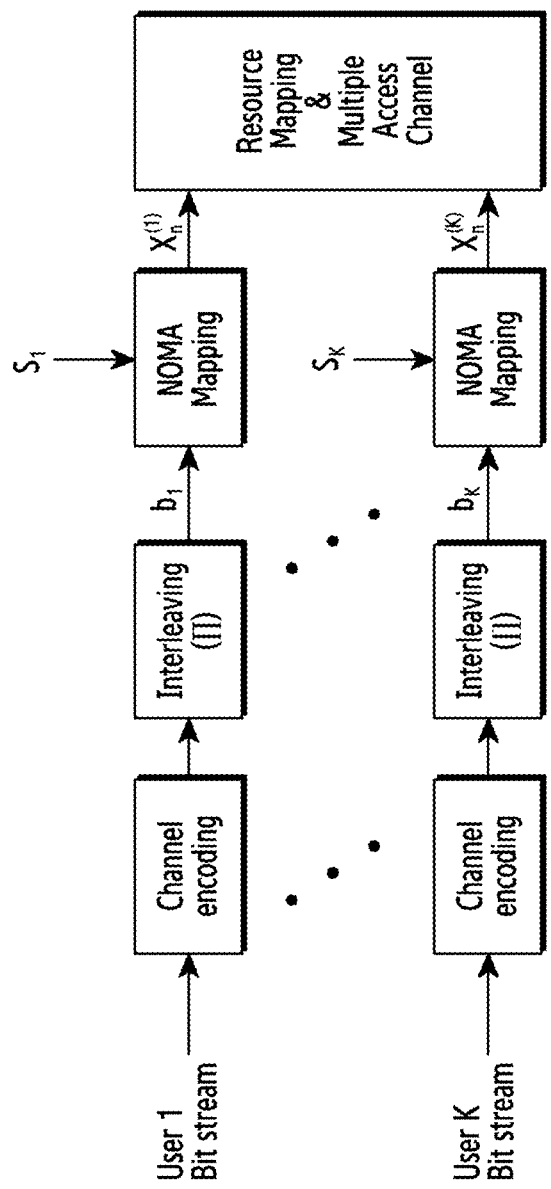
FIG. 4 is a view illustrating a functional configuration of a transmission method of NOMA according to various embodiments of the disclosure.

FIG. 4 illustrates a functional configuration of a transmission method of NOMA according to various embodiments of the disclosure. In FIG. 4, a system model of NOMA according to various embodiments of the disclosure is defined, and terms, definitions, etc. for explaining a NOMA technique according to various embodiments are described. Hereinafter, expression methods of variables, vectors, matrixes, or sets which are used to describe various embodiments of the disclosure will be described. Small letters (for example, x) indicate vectors, capital letters (for example, A) indicate matrixes, italics indicate variables, and cursive letters (for example, K, S) indicate sets. Additionally, diag (h) indicates a diagonal matrix in which h exists on a diagonal line as an element.

In a codebook-based NOMA method, M-ary user symbols are mapped onto an N-dimensional codeword. Herein, the N-dimensional codeword may be selected from a codebook of M codewords. Information bits are spread over N number of radio resources. It is assumed that there are K number of different codebooks that can be used to overlap signals of K number of terminals. In this case, an overloading factor is defined as in Equation 1 presented below:

$$\eta = K/N \qquad \text{Equation 1}$$

where K indicates a user and N indicates a dimension number.

An entire codebook set usable in a wireless communication environment is referred to as a mother codebook set. The mother codebook set may include one or more codebook sets. For example, the mother codebook set may include K number of codebook sets. The mother codebook set may be expressed as in Equation 2 presented below:

$$\tilde{\mathcal{C}} \triangleq \{\mathcal{C}_1, \mathcal{C}_2, \ldots, \mathcal{C}_K\} \qquad \text{Equation 2}$$

where $\tilde{\mathcal{C}}_k$ is the k-th codebook set (k=1, 2, . . . , K), and the k-th codebook set includes codebooks for M number of codewords. Herein, the k-th codebook set may be a codebook set for the terminal k. The codebook set is allocated to each user terminal. The codebook set may be expressed as in Equation 3 presented below:

$$\tilde{\mathcal{C}}_k = \{c_1^{(k)}, c_2^{(k)}, \ldots, c_M^{(k)}\} \qquad \text{Equation 3}$$

where $c_m^{(k)}$ indicates the m-th codeword (m=1, 2, . . . , M) of the codebook for the terminal k, and is given as in Equation 4 presented below:

$$c_m^{(k)} \in \mathbb{C}^N \text{ for } k=1,2,\ldots,K \qquad \text{Equation 4}$$

The m-th codeword $c_m^{(k)}$ of the codeword book for the terminal k may be designed according to an SCMA or PDMA method. The SCMA method or the PDMA method will be described below with reference to FIGS. 6A and 6B.

Referring to FIG. 4, a system model for codebook-based NOMA transmission of K number of users, that is, K number of terminals, will be described. It is assumed that there is a bit stream of the terminal k. The bit stream may be a channel-coded and interleaved bit stream. That is, each terminal may obtain a bit stream that is encoded by performing channel coding, interleaving with respect to the bit stream. An encoded bit stream of the terminal i may be expressed by $b_i$ (i=1, 2, . . . , K). In this case, the bit stream of the terminal k may be expressed as in Equation 5 presented below:

$$b_k \in \{0,1\}^{1 \times N_b} \qquad \text{Equation 5}$$

where $b_k$ indicates the bit stream of the terminal k, and $N_b$ indicates a bit number.

The bit stream of the terminal k may include $N_c$ number of codewords $$\left(N_c = \frac{N_b}{\log_2 M}\right).$$

Herein, it is assumed that $N_b$ is a multiple of $\log_2 M$. One modulated symbol corresponds to $\log_2 M$ bit(s), and corresponds to one of $N_c$ number of codewords. The bit stream of the terminal k may be expressed as in Equation 6 presented below:

$$b_n^{(k)} \in \{0,1\}^{1 \times \log_2 M} \quad \text{Equation 6}$$

where $b_n^{(k)}$ is a bit stream corresponding to the n-th codeword in the bit streams of the terminal k.

Each terminal may apply a signature for multiple access to perform NOMA. Each terminal i may identify a signature for the terminal i through a NOMA mapping block. The NOMA according to various embodiments of the disclosure may be codebook-based NOMA, and each signature may include a codebook. The terminal i may identify a codebook set $C_i$.

For the purpose of explaining a codebook mapping mechanism, $N_c$ number of symbols (codewords) may be distributed into $N_g (= N_c/v)$ number of groups. Herein, it is assumed that $N_c$ is a multiple of $v$. A codebook of the l-th codeword-resource of a transmission block of the terminal k may be expressed by $C_\ell^{(k)}$, and $\ell$ may be an integer between 1 and $v$ (that is, $\ell = 1, 2, \ldots, v$). A codebook set for the terminal k may be expressed by the following equation:

$$S_k = \{C_1^{(k)}, C_2^{(k)}, \ldots, C_v^{(k)}\}$$

$S_k$ is a codebook set for the terminal k, and is a subset of the mother codebook set. In some embodiments, $S_k$ may be iteratively applied to each of the $N_g$ number of groups. For example, $S_k$ may be iteratively applied to each of the $N_g$ number of groups in a round robin manner. Since the terminal according to various embodiments can transmit the $N_c$ number of codewords in total, the terminal i may identify a codebook corresponding to the respective codewords from the codebook set, and may perform resource mapping and channel access procedures based on the corresponding codebook.

The n-th codeword $(n=1, 2, \ldots, N_c)$ $b_n^{(k)}$ in the bit stream of the terminal k is mapped onto $x_n^{(k)} \in \mathbb{C}^N$. Herein, $x_n^{(k)}$ is derived from the codebook identified in $S_k$. In some embodiments, the codebook $x_n^{(k)}$ mapped onto the n-th codeword of the terminal k may be determined based on a modulo function. For example, $x_n^{(k)}$ may be determined as the $\mathrm{mod}(n,v)$-th codebook among the codebooks of $C_k$. $\mathrm{mod}(n,v)$ means "n" mod "v." That is, the terminal k may generate a sequence based on different codebooks in each codeword resource during v number of codeword resources from among the $N_c$ number of codewords in total, and may transmit the sequence to a base station. A total of $N_c$ number of codewords may be circularly applied to the codebooks of $S S_k$ in each of v number of codeword resources. For example, relationship of the codebook set, n, and v may be configured as shown in table 1 presented below:

TABLE 1

| mod(n,v) | 0 | 1 | 2 | 3 |
|---|---|---|---|---|
| $S_1$ | $C_1$ | $C_6$ | $C_2$ | $C_5$ |
| $S_2$ | $C_2$ | $C_5$ | $C_3$ | $C_4$ |
| $S_3$ | $C_3$ | $C_4$ | $C_1$ | $C_6$ |

TABLE 1-continued

| mod(n,v) | 0 | 1 | 2 | 3 |
|---|---|---|---|---|
| $S_4$ | $C_4$ | $C_3$ | $C_6$ | $C_1$ |
| $S_5$ | $C_5$ | $C_2$ | $C_4$ | $C_3$ |
| $S_6$ | $C_6$ | $C_1$ | $C_5$ | $C_2$ |

In some other embodiments, the codebook $x_n^{(k)}$ mapped onto the n-th codeword of the terminal k may be identified from among the codebooks of $S_k$ according to a pre-designated mapping relationship. For example, a mapping table or a mapping function defining a relationship between each codebook $C_\ell^{(k)}$ of $S_k$ and n may be stored in the base station and the terminal. In addition, information regarding the relationship between each codebook $C_\ell^{(k)}$ of $S_k$ and n may be signaled between the base station and the terminal.

A relationship between the n-th codeword of the terminal k and the codebook $x_n^{(k)}$ may be defined as a mapping function as in Equation 7 presented below:

$$x_n^{(k)} = f(b_n^{(k)}), \text{ where } f: \{0,1\}^{\log_2 M} \to c_m^{(k)} \in C_k \quad \text{Equation 7}$$

The n-th codeword $b_n^{(k)}$ of the terminal k is mapped onto an N-dimensional complex codeword in the k-th codebook.

A fading channel vector of the terminal k of a radio resource onto which the n-th codeword is mapped is $h_n^{(k)} \in \mathbb{C}^N$. In this case, a received signal $y_n$ may be expressed as in Equation 8 presented below. Signals of the K number of terminals may be transmitted while overlapping one another.

$$y_n = \sum_{k=1}^{K} \mathrm{diag}(h_n^{(k)}) x_n^{(k)} + \omega_n, \text{ for } n=1,2,\ldots,N_c \quad \text{Equation 8}$$

where $\omega_n$ is $CN(0, \sigma^2 I_N)$, $\sigma^2$ is an ambient noise power, and $I_N$ is an N×N unit matrix. Even when signals of terminals overlap one another in a state where orthogonality between resources is not satisfied, a signature for NOMA is applied to an encoded bit stream, so that a reception end can effectively detect the signals of the terminals.

Overlapping between codewords of terminals when radio resources are mapped may be expressed by an indication matrix. The indication matrix may be expressed as in Equation 9 presented below:

$$V \in \{0,1\}^{N \times K} \quad \text{Equation 9}$$

where N indicates the number of radio resources and K indicates the number of overlapping terminals. When the k-th terminal is mapped onto the i-th resource, $v_{i,k}=1$. Herein, the number of radio resources may correspond to a length of a code of a codebook of SCMA or PDMA, that is, to an area for spreading information bits. For example, it is assumed that six terminals (that is, six codebooks) overlap in four radio resources (for example, resource elements (REs)) and transmit signals through the codebook-based NOMA technique. In this case, the overloading factor η is 1.5. For example, the indication matrixes of SCMA and PDMA are $V_{SCMA}$ and $V_{PDMA}$, respectively. For example, $V_{SCMA}$ and $V_{PDMA}$ may be expressed as in Equation 10 presented below:

$$V_{SCMA} = \begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix} \text{ and } V_{PDMA} = \begin{bmatrix} 1 & 0 & 1 & 1 & 1 & 0 \\ 1 & 1 & 0 & 1 & 0 & 1 \\ 1 & 1 & 1 & 0 & 1 & 0 \\ 0 & 1 & 1 & 0 & 0 & 1 \end{bmatrix} \quad \text{Equation 10}$$

Referring to Equation 10, it is identified that the indication matrix for the SCMA and the indication matrix for the PDMA are designed in different ways. The SCMA may maintain a balance of a diversity order between terminals, that is, layers, whereas the PDMA induces a difference regarding a transmit diversity order to make it easy to receive based on SIC (successive interference cancelation). The codebooks of the SCMA and the PDMA may be generated through constellation rotation and simple spreading, respectively, according to the resource display matrixes of Equation 10. According to various embodiments, information for indicating whose signals overlap among codebooks in what radio resource, like the indication matrix, may be referred to as overlapping information. The terminal may obtain at least one of a diversity order or an interference level of each terminal from overlapping information, and may identify a codebook to use, based on the grasped information.

Figure 5A:
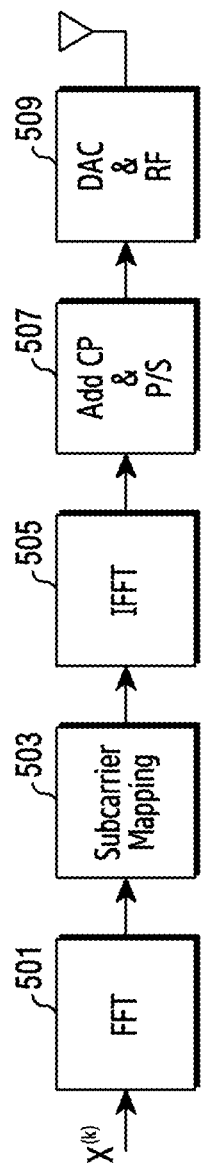
FIG. 5A is a view illustrating a functional configuration of a transmitter of NOMA according to various embodiments of the disclosure.

FIG. 5A illustrates a functional configuration of a transmitter of NOMA according to various embodiments of the disclosure. When uplink signals of a plurality of terminals are transmitted while overlapping with the same time-frequency resource (for example, resource element), the transmitter may be each of the terminals (for example, the terminal 120, the terminal 130, the terminal 140, the terminal 150 of FIG. 1). To the contrary, in the case of NOMA transmission for downlink signals, the transmitter may be a base station (for example, the base station 110 of FIG. 1). Hereinafter, a case where a terminal k is a transmitter and transmits a codeword to a base station will be described by way of an example.

Referring to FIG. 5A, the transmitter may transmit a codeword $x^{(k)}$ to a fast Fourier transform (FFT) block 501. A bit stream of the terminal k may include a plurality of bits. Each bit is a channel-coded and interleaved bit. Such a plurality of bits may be divided into M-ary symbols (a modulation order is $\log_2 M$) through modulation. Each symbol may be mapped onto one of codewords of a codebook for the M-ary symbol. $x^{(k)}$ refers to one or more codewords mapped in this way. The transmitter may convert the codeword into a signal of a frequency domain by performing $N_c \times M$-point FFT operation 501. The transmitter may map a subcarrier onto each codeword (503), and then may perform an inverse FFT (IFFT) operation (505) again. In addition, the transmitter performs cyclic prefix (CP) addition and parallel-to-series (P/S) conversion (507). The transmitter may convert a resulting signal into an analogue area through DAC and then may transmit the signal to an RF module (509).

Figure 5B:
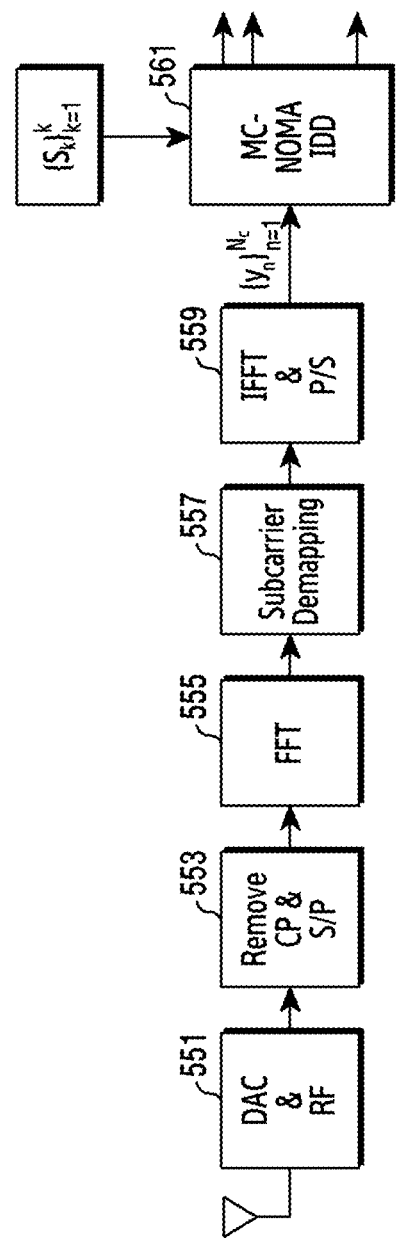
FIG. 5B is a view illustrating a functional configuration of a receiver of NOMA according to various embodiments of the disclosure.

FIG. 5B illustrates a functional configuration of a receiver of NOMA according to various embodiments of the disclosure. When uplink signals of a plurality of terminals are transmitted while overlapping with the same time-frequency resource (for example, resource element), the receiver may be a base station (for example, the base station 110 of FIG. 1). To the contrary, in the case of NOMA transmission for downlink signals, the receiver may be each of the terminals (for example, the terminal 120, the terminal 130, the terminal 140, the terminal 150 of FIG. 1). Hereinafter, a case where a base station is a receiver and receives uplink signals from respective terminals will be described by way of an example.

Referring to FIG. 5B, the receiver may receive uplink signals. The receiver may receive a signal in which uplink signals of K number of terminals overlap one another (hereinafter, an overlapping signal). The receiver may obtain a codeword of the overlapping signal by performing digital-to-analogue conversion (DAC) (551), CP removal and serial-to-parallel (S/P) conversion (553), FFT (555), subcarrier demapping (557), IFFT and P/S conversion (559) with respect to the overlapping signal. Thereafter, the receiver may separate an uplink signal of each terminal (for example, the terminal k) from the codeword $y_n$ (n=1, 2, . . . , $N_c$) of the overlapping signal. The receiver may separate the uplink signal from the codeword of the overlapping signal, based on information of a codebook (for example, $S_k$ (k=1, 2, . . . , K)) used in each terminal.

In some embodiments, the receiver may supply the codeword to an MC-NOMA iteration detection and decoding (IDD) block 561. The receiver may separate the uplink signal of each terminal (for example, the terminal k) through the MC-NOMA IDD block. A received signal vector $y_n$ indicating transmission of the codeword of the overlapping signal is provided as an input to a NOMA detector. The NOMA detector calculates an extrinsic log-likelihood ratio (LLR) of each of coded bits, based on extrinsic information calculated by a channel decoder. Thereafter, the LLR information calculated by the NOMA detector may be de-interleaved and then may be supplied to the channel decoder, and the channel decoder calculates its own LLR information again. Iteration between the NOMA detector and the channel decoder may be performed a predetermined number of times of iteration. Such iteration detection and decoding may more maximize the effect thereof in MC-NOMA than in SC-NOMA. A detailed logic of the MC-NOMA IDD block 561 will be described in detail below with reference to FIG. 5C.

Figure 5C:
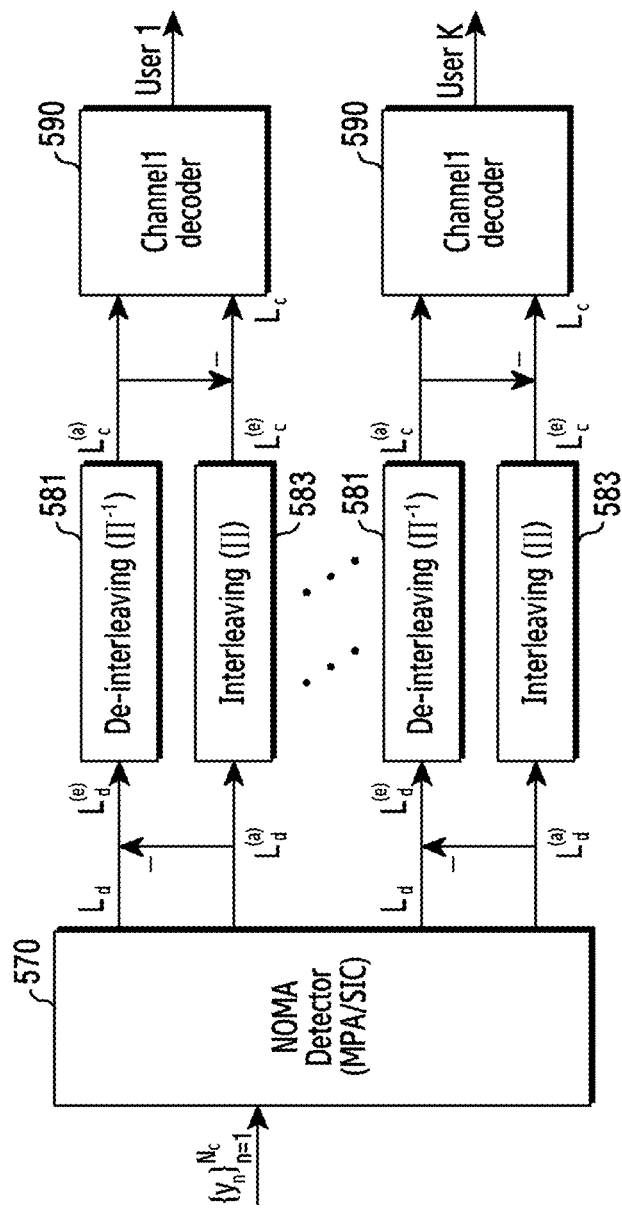
FIG. 5C is a view illustrating a functional configuration of iteration detection and decoding (IDD) of the receiver of the NOMA according to various embodiments of the disclosure.

FIG. 5C illustrates a functional configuration of IDD of a receiver of NOMA according to various embodiments of the disclosure. The receiver may correspond to the receiver of FIG. 5B.

Referring to FIG. 5C, an IDD block for MC-NOMA may include a NOMA detector 570, a de-interleaving unit 581, an interleaving unit 583, and a channel decoder 590. For example, the de-interleaving unit 581 may include de-interleavers for respective terminals. For example, the interleaving unit 583 may include interleavers for the respective terminals. For example, the channel decoder 590 may include channel decoders for the respective terminals.

The IDD enhances performance (for example, a bit error rate (BER)) by iteratively exchanging soft information between the NOMA detector 570 and the channel decoder 590. According to various embodiments of the disclosure, such an IDD technique may be applied to MC-NOMA (for example, the MC-SCMA, MC-PDMA) of the disclosure.

A total of $N_c$ number of overlapping codewords are transmitted, and a reception signal vector for each overlapping signal is $y_n$(n=1, 2, . . . , $N_c$). The received signal $y_n$(n=1, 2, . . . , $N_c$) may be provided as an input to the NOMA detector 570. When a priori LLR vector ($L_c^{(a)}$) calculated by the channel decoder 590 is interleaved and then is transmitted, the NOMA detector 570 calculates a posterior LLR vector ($L_d(b_\ell^{(k)})$) of the terminal k (k= 1, . . . , K). $L_d(b_\ell^{(k)})$ is a posterior LLR vector value regarding the $\ell$-th bit of the terminal k. Each encoded bit is $b_\ell^{(k)}$ ($\ell$=1, . . . , $N_b$). The NOMA detector 570 may decompose an extrinsic LLR ($L_d^e(b_\ell^{(k)})$) and a priori LLR ($L_d^a(b_\ell^{(k)})$) from the encoded bits. For example, the posterior LLR vector may be decomposed as in Equation 11 presented below:

$$L_d(b_\ell^{(k)}) = L_d^e(b_\ell^{(k)}) + L_d^a(b_\ell^{(k)}) \qquad \text{Equation 11}$$

The posterior LLR $L_d(b_\ell^{(k)})$ from the NOMA detector 570 may be calculated by message-passing algorithm (MPA) or successive interference cancelation. Furthermore, the extrinsic LLR ($L_d^e(b_\ell^{(k)})$) may be de-interleaved (581) and may be used by the channel decoder 590 as priori information. That is, $L_c^a = \Pi^{-1}(L_d^e)$. In a similar way to that of the channel decoder 590, the posterior LLR value of each encoded bit may be given as in Equation 12 presented below:

$$L_c(b_\ell^{(k)}) = L_c^e(b_\ell^{(k)}) + L_c^a(b_\ell^{(k)}) \qquad \text{Equation 12}$$

The extrinsic LLR information from the channel decoder 590 may be interleaved to be a priori LLR value of the detector. That is, $L_d^a(b_\ell^{(k)}) = \Pi(L_c^e(b_\ell^{(k)}))$.

The NOMA detector 570 and the channel decoder 590 may exchange extrinsic LLR values with each other in a predetermined number of times of iteration. As will be described in FIG. 14C, it can be identified that the IDD is useful particularly in MC-NOMA. To show that the IDD is more effective in MC-NOMA, it is assumed that a combination of a channel $h_n^{(k)}$ that the n-th codeword of the terminal k goes through and a used codebook is the worst scenario (for example, a low channel gain and a low diversity in PDMA). In this case, there is a high probability that the n-th codeword $b_n^{(k)}$ of the terminal k has an error due to the NOMA detector. However, since the same terminal k uses a high-order codebook in transmitting adjacent codewords in MC-NOMA, the priori information ($L_d^{(a)} = \Pi(L_c^{(e)})$) calculated by the channel decoder 590 can correct error detection with a higher probability. On the other hand, in the case of SC-NOMA, since an undesirable channel condition continues coherence time/frequency resources, a detected error may not be reversible for the channel decoder 590.

1. Multiple Codebooks-Based NOMA (MC-NOMA)

According to a method of selecting and using a codebook from a codebook set, a codebook-based NOMA method may be single codebook (SC)-NOMA using a single codebook or MC-NOMA using a plurality of codebooks (hereinafter, multiple codebooks). The disclosure describes a method of using multiple codebooks instead of a single codebook. Hereinafter, methods for a plurality of terminals to apply codebooks and transmit signals in SC-NOMA and MC-NOMA will be compared and described through FIGS. 6A and 6B. SC-SCMA and MC-SCMA will be described through FIG. 6A, and allocation of codebooks of SC-PDMA and MC-PDMA will be described through FIG. 6B.

Figure 6A:
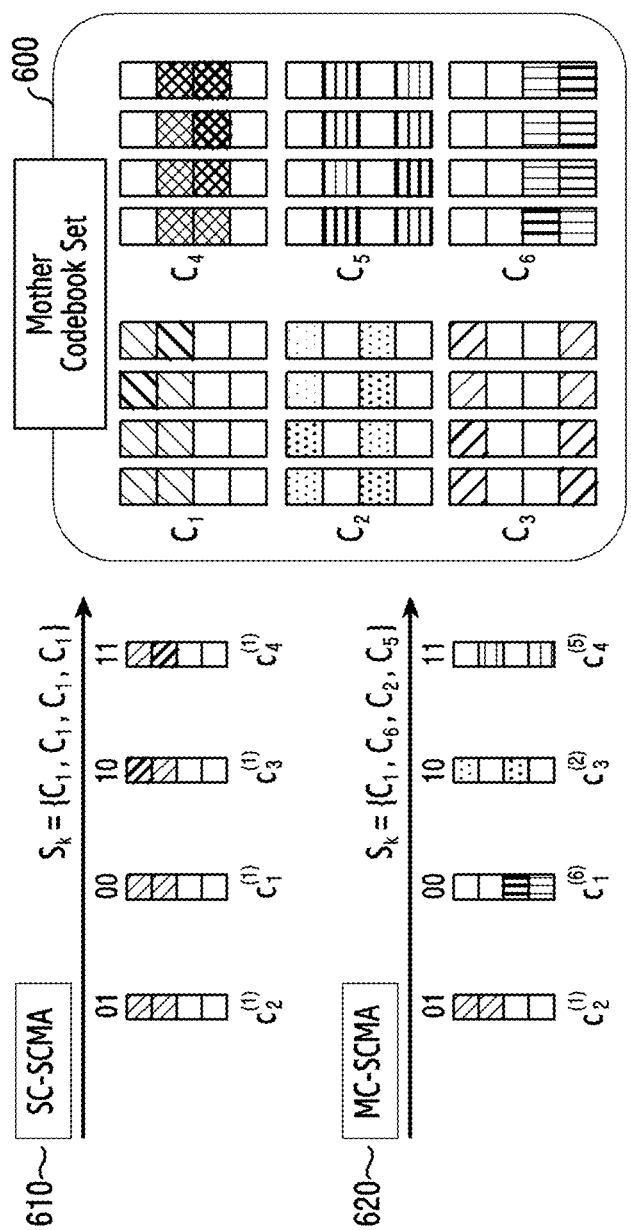
FIG. 6A is a view illustrating an example of multiple codebooks (MC)-sparse code multiple access (SCMA) according to various embodiments of the disclosure.

FIG. 6A illustrates an example of MC-SCMA according to various embodiments of the disclosure. The SCMA is performed through a codebook including codes based on sparsity. Each terminal may select and apply a vector within a codebook through a codebook allocated to the terminal or pre-configured and may transmit a signal. A case where each terminal transmits a signal across four symbols in total will be described. A case where six codebooks are configured in a mother codebook set, and a codeword of a length 4 (dimension: 4) is transmitted in each symbol during four symbols will be described by way of an example. Bits of each modulation symbol may be mapped onto a codeword obtained from a codebook.

Referring to FIG. 6A, in SC-SCMA 610, a terminal may obtain a single codebook for the terminal from a mother codebook set 600. For example, the terminal may obtain a codebook $C_1$ for the terminal from the mother codebook set. Herein, the obtained codebook may be used across a transmission period (for example, four symbols), which will be described below. The codebook may include codes indicating symbol values corresponding to M-ary. For example, the terminal may transmit a signal to which codes corresponding to "'01,'" "'00,'" "'10,'" "'11,'" respectively, are applied during four symbols. In the case of the SC-SCAM 610, the terminal uses a single codebook, and therefore, may apply codes corresponding to respective symbol values in the codewords in the same codebook and may transmit a signal during four symbols. $c_a^{(b)}$ refers to the a-th codeword of the b-th codebook in the mother codebook set. For example, the terminal may transmit a signal to which codes are applied in order of $c_2^{(1)}, c_1^{(1)}, c_3^{(1)}, c_4^{(1)}$.

In MC-SCMA 620, the terminal may obtain two or more codebooks for the terminal from the mother codebook set 600. Hereinafter, the two or more codebooks will be referred to as a codebook set. A codebook set for the terminal k may be expressed by $S_k$. For example, the terminal may obtain codebooks $C_1, C_6, C_2, C_5$ for the terminal from the mother codebook set. Herein, the obtained codebooks may be used across a transmission period (for example, four symbols) which will be described below. Each codebook may include codes indicating symbol values corresponding to M-ary. For example, the terminal may transmit symbol values corresponding to "'01,'" "'00,'" "'10,'" "11," respectively, during four symbols. In the case of the MC-SCMA 620, the terminal uses multiple codebooks, and therefore, may apply codes corresponding to respective symbol values by using different codebooks in four symbols, and may transmit a signal. $c_a^{(b)}$ refers to the a-th codeword of the b-th codebook in the mother codebook set. For example, the terminal may transmit a signal to which codes are applied in order of $c_2^{(1)}, c_1^{(6)}, c_3^{(2)}, c_4^{(5)}$.

FIG. 6A illustrates that the codebooks of the multiple-codebook set are used in the round robin manner, but this is merely an example and embodiments of the disclosure are not limited thereto. According to an embodiment, the terminal may change the codebook based on channel quality. For example, the terminal may change the codebook when channel quality is less than or equal to a threshold value. Alternatively, according to an embodiment, the terminal may identify a codebook in each symbol based on a proportion fair (PF) algorithm and may apply and use a codeword from the identified codebook.

Figure 6B:
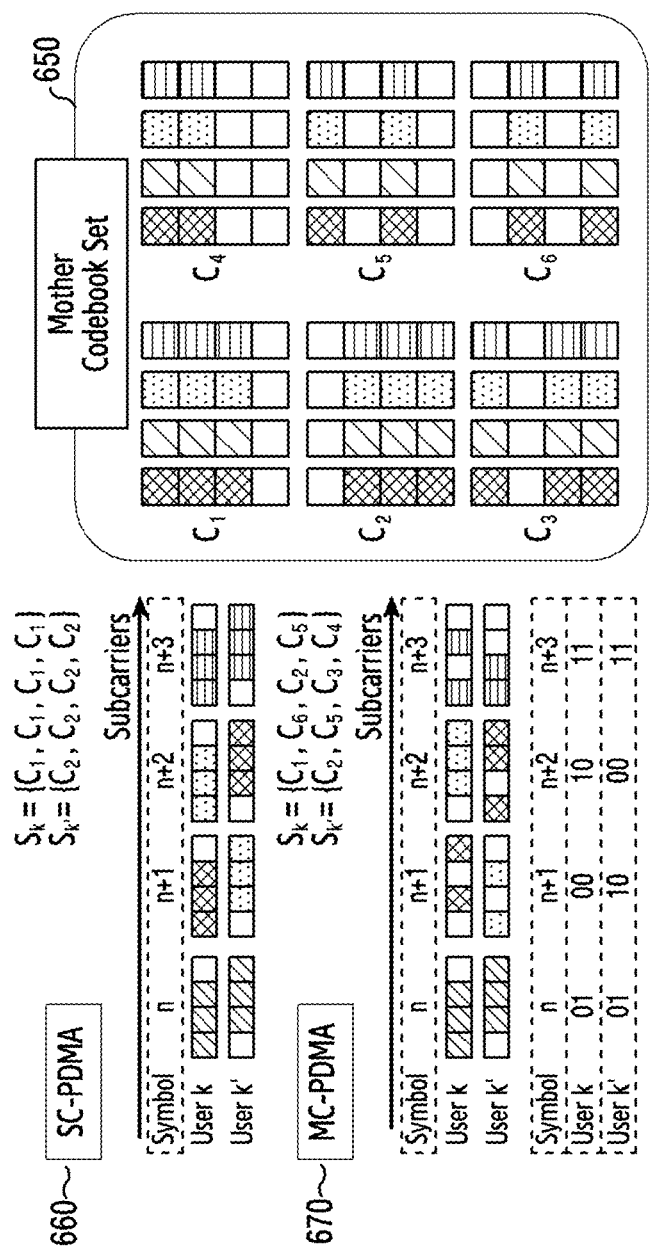
FIG. 6B is a view illustrating an example of MC-pattern division multiple access (PDMA) according to various embodiments of the disclosure.

FIG. 6B illustrates an example of MC-PDMA according to various embodiments of the disclosure. The PDMA may be performed through a codebook including spreading sequences having patterns. Each terminal may select and apply a vector in a codebook through a codebook allocated to the terminal or pre-configured and may transmit a signal. A case where each terminal transmits a signal across four symbols in total will be described. A case where six codebooks are configured in a mother codebook set and a codeword of a length 4 (dimension: 4) is transmitted in each symbol during four symbols will be described. Bits of each modulation symbol are mapped onto a codeword obtained from a codebook. A case where a first terminal k and a second terminal k' transmit signals while overlapping the signals for the sake of PDMA will be described.

Referring to FIG. 6B, in SC-PDMA 660, each terminal may obtain a single codebook from a mother codebook set 650. For example, the first terminal k may obtain a codebook $C_1$ for the first terminal k from the mother codebook set. The second terminal k' may obtain a codebook $C_2$ for the second terminal k' from the mother codebook set. Herein, the obtained codebook may be used across a transmission period (for example, four symbols) which will be described below. For example, the first terminal k may transmit a signal to which patterns corresponding to "'01," "'00," "'10," "'11," respectively, are applied during four symbols, based on the codebook $C_1$. The second terminal k' may transmit a signal to which patterns corresponding to "'01," "'10," "'00," "'11," respectively, are applied during four symbols, based on the codebook $C_2$. The codebook may include patterns indicating symbols values corresponding to M-ary. In the case of the SC-PDMA 660, each terminal uses a single codebook, and therefore, may apply patterns corresponding to respective symbol values among patterns in the same codebook and may transmit a signal during four symbols.

In the MC-PDMA 670, each terminal may obtain two or more codebooks from the mother codebook set 650. Hereinafter, the two or more codebooks will be referred to as a codebook set. The codebook set for the terminal k may be expressed by $\mathcal{C}_k$. For example, the first terminal k may obtain codebook sets $C_1, C_6, C_2, C_5$ for the terminal from the mother codebook set. The second terminal k' may obtain codebook sets $C_2, C_5, C_3, C_4$ for the terminal from the mother codebook set. Herein, the obtained codebook may be used across a transmission period (for example, four symbols), which will be described below. Each codebook may include patterns indicating symbol values corresponding to M-ary. For example, the first terminal k may transmit a signal to which patterns corresponding to "'01," "'00," "'10," "'11," respectively, are applied during four symbols, based on the codebook set $\mathcal{S}_1$. The second terminal k' may transmit a signal to which patterns corresponding to "'01," "'10," "'00," "'11," respectively, are applied during four symbols, based on the codebook set $\mathcal{S}_2$.

FIG. 6B describes the case where the first terminal k and the second terminal k' perform communication through the MC-PDMA. The first terminal and the second terminal may use a first codebook set $\{C_1, C_6, C_2, C_5\}$ and a second codebook set $\{C_2, C_5, C_3, C_4\}$, respectively, in the round robin manner. By using the multiple codebooks, interference diversity and code diversity (or pattern diversity) can be guaranteed. Accordingly, the terminals can obtain a relatively high communication gain in comparison to a signal codebook even in a poor channel environment.

FIG. 6B illustrates that the codebooks of the multiple-codebook set are used in the round robin manner, but this is merely an example and embodiments of the disclosure is not limited thereto. According to an embodiment, the terminal may change the codebook based on channel quality. For example, the terminal may change the codebook when channel quality is less than or equal to a threshold value. Alternatively, according to an embodiment, the terminal may identify a codebook from each symbol based on a PF algorithm and may apply and use a pattern from the identified codebook.

As an example of a technique utilizing NOMA using multiple codebooks, that is, MC-NOMA, the MC-SCMA and the MC-PDMA have been described through FIGS. 6A and 6B, respectively. By changing the codebook, each terminal may use interference and code diversity. Accordingly, even when a channel condition is bad, each terminal may perform robust communication through the diversity effect. Hereinafter, a detailed example for designing codebooks for NOMA will be described through FIGS. 7 and 8.

2. Multiple-Codebook Design

In existing NOMA, each user uses a unique codebook. That is, the existing NOMA method corresponds to a special case where the same codebook is applied to all symbols of each group of a transmit block. However, if NOMA is designed with reference to a single codebook, an undesirable channel condition may continue across transmission of a plurality of codewords. Accordingly, various embodiments of the disclosure suggest an apparatus, a method, and a system for MC-NOMA. Since quality may continuously deteriorate when a single codebook is used in a poor channel environment, the above-described problem may be solved by using multiple codebooks. The codebook refers to a set of codes to be applied to a transmission signal. Such codes are codewords that are defined to distinguish between a signal of another terminal and a signal of a corresponding terminal even when the signals are transmitted in the same time-frequency resource, and may be defined based on a sequence length of a transmitted signal.

According to various embodiments, each terminal uses different codebooks across a plurality of continuous resources (for example, symbols (for example, each symbol corresponds to $\log_2 M$ bit(s))). That is, each terminal does not use a fixed single codebook during the plurality of continuous resources but transmits a signal while changing at least two codebooks of the plurality of codebooks.

The main purpose of the MC-NOMA is to make an effect by a channel state uniform (that is, averaging) by using code diversity (or interference diversity). By generating a signal by applying a different code in the unit of a designated resource (codeword resource), each terminal has an effect that respective signals go through different channels. According to an embodiment, the codeword resource may be symbols that include one or more subcarriers in a frequency domain. In addition, according to an embodiment, the codeword resource may be one or more symbols that are distinct from one another in a time domain. In addition, according to an embodiment, the codeword resource may be a space that is specified in each of the time domain and the frequency domain. Hereinafter, a resource structure for codebook-based NOMA of the disclosure will be described through FIG. 7, and detailed requirements for designing a codebook will be described through FIG. 8.

Figure 7:
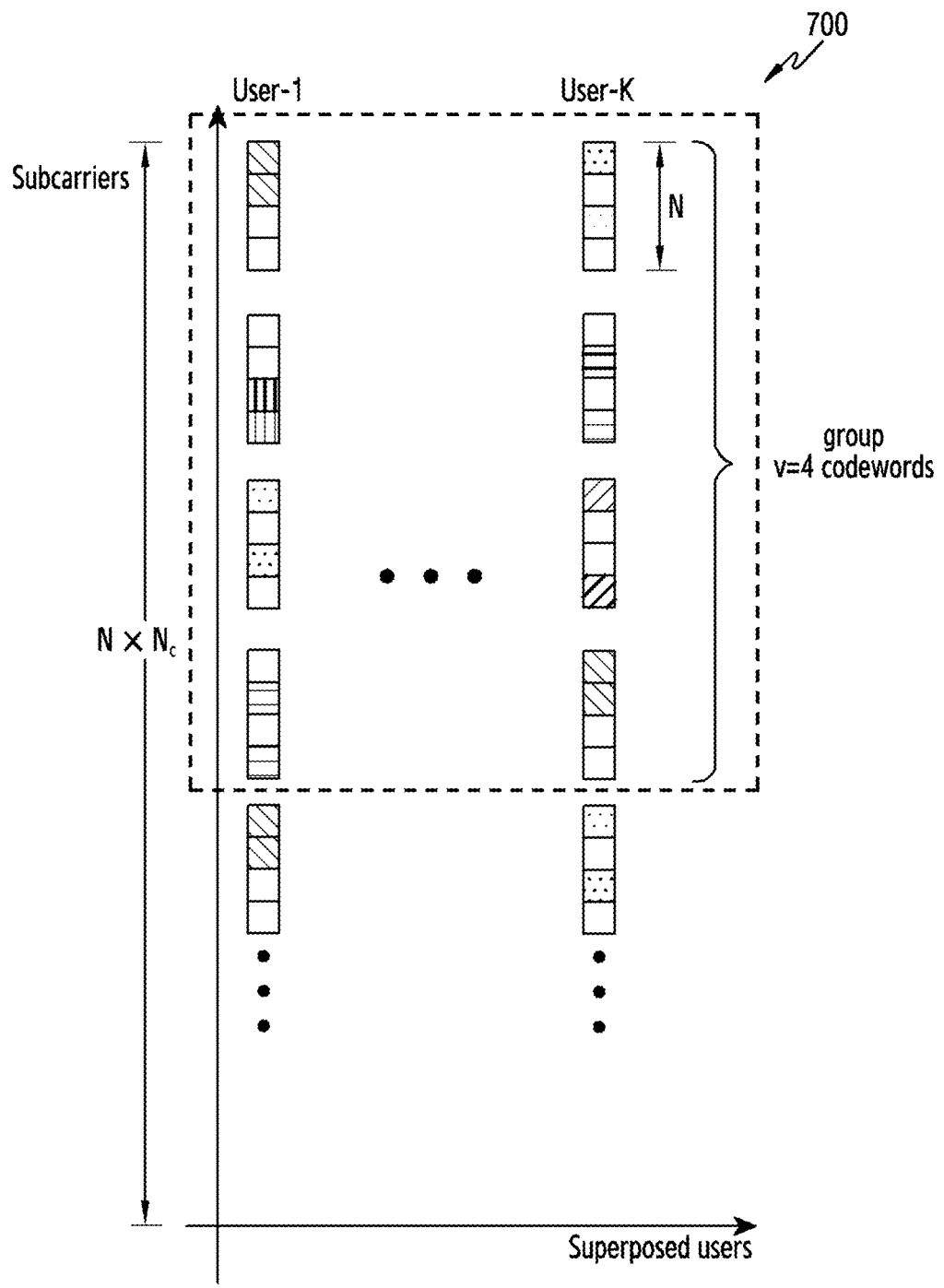
FIG. 7 is a view illustrating an example of resource mapping of MC-NOMA according to various embodiments of the disclosure.

FIG. 7 illustrates an example 700 of resource mapping of MC-NOMA according to various embodiments of the disclosure. FIG. 7 illustrates a case where K number of terminals in total transmit signals, and the signal of each terminal applies a different codebook according to a codeword on a frequency domain, by way of an example. Each terminal may transmit $N_c$ number of codewords in total. It is assumed that a length of each codeword is N.

Referring to FIG. 7, the frequency domain may be expressed by a subcarrier unit. There may exist $N \times N_c$ number of subcarriers in total and signals of the respective terminals may overlap one another and may be transmitted across v number of codeword resources in total. Since each codeword has a length of N-symbol, the signals of the terminals may be mapped onto $N \times N_c$ number of subcarriers. In addition, different codebooks may be applied across v number of codeword resources and signals may be transmitted. For example, codewords of different codebooks may be applied to each codeword resource and the signals may be transmitted during four codeword resources. In this case, since the terminal applies a different codebook to each codeword resource (for example, four symbols) and transmits the signals, and codebooks used by the terminal in the same symbol are also different, overlapping signals may be distinguished from one another.

In existing NOMA, each user uses a unique mother codebook. For example, a unique single codebook is applied to each user. That is, the existing NOMA method corresponds to a special case where the same codebook is applied to all symbols of each group of a transmit block. Such arrangement of a specific codebook implies that interference diversity is not completely used. Accordingly, as shown in FIG. 7, terminal #1 to terminal #K according to various embodiments of the disclosure may generate and transmit a signal by using different codebooks in the same resource (for example, the same subcarriers). In this case, in order to make overlapping signals easily detected at a receiver, codes of SCMA of the codebook or patterns of PDMA need to be designed to have a maximum Euclidian distance (ED) with codewords from different codebooks. However, since random scaling of channels and rotation of a constellation in current SC-SCMA do not meet optimality of a received signal, reception performance may deteriorate. A detailed example will be described through FIG. 8.

Figure 8:
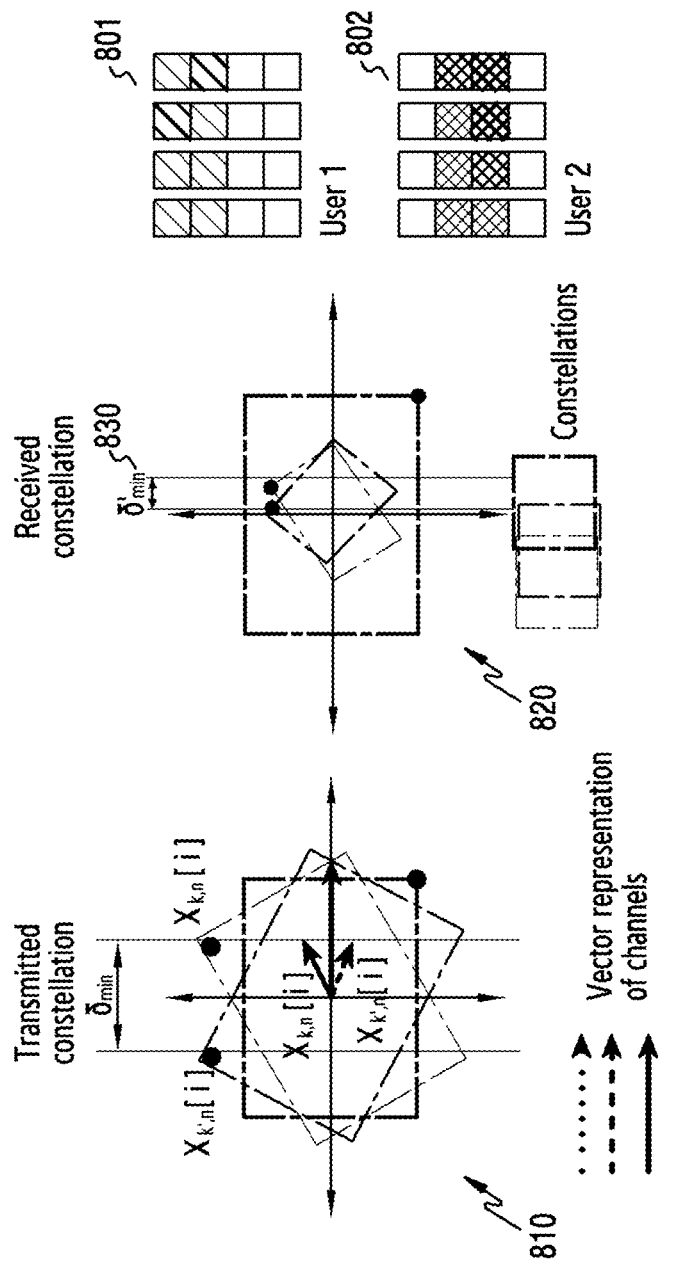
FIG. 8 is a view illustrating an example of a codebook design of MC-NOMA according to various embodiments of the disclosure.

FIG. 8 illustrates an example of a codebook design of MC-NOMA according to various embodiments of the disclosure. In FIG. 8, SCMA will be described by way of an example. When codes are applied according to SCMA, a constellation of symbols is rotated.

Referring to FIG. 8, the n-th codeword transmitted on a symbol i of the terminal k is expressed by $x_{k,n}[i]$. A channel that the terminal k transmits and goes through is expressed by $h_{k,n}[i]$. A constellation 810 may include constellation points of each terminal (transmission end). As in the constellation 810, it is required that a sufficient ED($\delta_{min}$) between a constellation point ($x_{k,n}[i]$) of the first terminal k and a constellation point ($x_{k',n}[i]$) of the second terminal k' is guaranteed. In addition, since channels that the respective terminals go through are different ($h_{k,n}[i]$ and $h_{k',n}[i]$), a codebook applied to each terminal should be designed by considering this. This is because, if an angle between constellation points of the constellation and an angle between channel vectors are similar to each other, there is a high probability that there is a confusion at a reception side due to constellation rotation between overlapping signals. Each terminal may perform constellation rotation through codes of a codebook.

An angle ($\theta$) between channel vectors of the two terminals may be defined as in Equation 13 presented below:

$$\theta = \cos^{-1}\left(\frac{h_n^{(k)}[i]h_n^{(k')}[i]}{|h_n^{(k)}[i]||h_n^{(k')}[i]|}\right)$$
Equation 13

When an angle ($\theta$) between channel elements is similar to an angle between adjacent constellation points of two users, received constellation points are close to each other, and therefore, a receiver may be confused on the constellation points. A constellation 820 may be an example of a scenario where SCMA constellation design based on rotation fails. Accordingly, it is required that a codebook is designed to guarantee a sufficient Euclidean distance (for example, an ED distance longer than or equal to a threshold) at a reception side. That is, codewords of a codebook 801 of the first terminal k and a codebook 802 of the second terminal k' may be configured to guarantee a minimum Euclidean distance even if constellation points are adjacent to each other. For example, each codebook may be configured such that phase rotation caused by two codewords is smaller than an angle between adjacent modulation symbols.

In addition, since in the MC-NOMA according to various embodiments of the disclosure, one terminal transmits a signal by using different codebooks in adjacent resources, the above-described minimum Euclidean distance is required to be considered when a codebook between adjacent resources is designed. This is because there is a high probability that signals transmitted in adjacent resources go through a relatively similar channel state. That is, since a channel of each terminal has a high correlation with continuous radio resources, the above-described requirements (for example, guarantee of a sufficient ED distance, and a degree of phase rotation of each codeword) should be fulfilled when a codebook set of a terminal is designed in multiple codebooks-based NOMA. The codebook set according to various embodiments may be configured based on a distance metric between adjacent resources (for example, adjacent symbols (v)). In some embodiments, the codebook set may be configured such that the distance metric between adjacent resources is greater than or equal to a threshold value. In addition, in some embodiments, the codebook set may be configured such that a sum of distance metrics between adjacent resources reaches a maximum.

Considering the above-described requirements for designing the codebook, an algorithm for allocating a plurality of codebooks of a mother codebook set to terminals may be considered as presented below. If codeword resources of the terminal k are different in the MC-NOMA, used codebooks are different and this may be expressed by $C_\ell^{(k)} \neq C_{\ell'}^{(k)}$, $\ell \neq \ell'$, $\ell, \ell' = 1, 2, \ldots, v$. There is a difference from the case where the same codebook is used in the terminal k regardless of symbols, that is, the case of SC-NOMA where $C_\ell^{(k)} = C_k$, $\ell = 1, 2, \ldots, v$.

The codebook set of the terminal k is $S_k$. The k-th codebook of the mother codebook set 600 may be allocated to the terminal k.

$$S_k = \{C_1^{(k)} = C_k\}, k=1,2,\ldots,K$$
Equation 14

That is, the codebook set for each terminal may be initialized to $S_1 = \{C_k\}$, $S_2 = \{C_k\}$, ..., $S_K = \{C_K\}$. This initialization is merely an example and may be configured in different ways.

When an initial codebook is determined, a next codebook may be determined based on the initial codebook. With respect to the next resources ($\ell = 2, 3, \ldots, v$), a codebook ($C^*$) for maximizing a specific parameter function g( ) considering previously selected codebooks $C_{\ell-1}^{(k)}$ may be added to the set $S_k$. For example, the codebook of the terminal k of the resource $\ell$ may be identified as in Equation 15 presented below:

$$C_\ell^{(k)} = \arg\max_{C^*} g(C^*, C_{\ell-1}^{(k)})$$
Equation 15

$$S_k \leftarrow S_k \cup \{C^*\}$$

In the disclosure, such a parameter function (g( )) may be referred to as a characteristic function, a design function, etc. Furthermore, to avoid a codebook collision with other terminals, the codebook of the terminal k may be selected from codebooks thar are not used in the corresponding resource ($\ell$). For example, the codebook of the terminal k in the corresponding resource ($\ell$) may satisfy Equation 16 presented below:

$$C^* \in S_k \text{ and } C^* \in \{C_\ell^{(1)}, C_\ell^{(2)}, \ldots, C_\ell^{(k-1)}\}$$
Equation 16

In the case of SCMA, a parameter function is defined based on a Euclidean distance between codebooks. That is, a Euclidean distance expressed in a constellation during overlapping may be required to be long to make it easy to distinguish between adjacent symbols. For example, the parameter function is defined to minimize the Euclidean distance between codebooks. For example, the parameter function may be defined as in Equation 17 presented below:

$$g(\mathcal{C}_k, \mathcal{C}_{k'}) = \min_m \|(c_m^{(k)})^H (c_m^{(k')})\|$$  Equation 17 where $\mathcal{C}_i$ indicates a codebook of the terminal i.

For example, a multiple-codebook set for MC-SCMA may be formed as shown in table 1 presented above. Referring to table 1 presented above, an ED difference is larger in order of $\{\mathcal{C}_2, \mathcal{C}_5, \mathcal{C}_1, \mathcal{C}_6, \mathcal{C}_3, \mathcal{C}_4\}$, such that a reception end can easily detect a signal of a specific terminal when different codebooks are used between adjacent symbols.

Since the problem caused by a single codebook still exists in SC-PDMA, the requirements for designing a codebook for MC-NOMA may be equally applied to PDMA. In this case, unlike in PDMA using uniform sparsity, the parameter function of Equation 14 to Equation 16 may be determined based on a transmit diversity or interference diversity order of PDMA. The transmit diversity/interference diversity order may be determined based on an indication matrix. When codebooks are aligned based on the transmit diversity/interference diversity order, the parameter function may be defined based on the reverse of the alignment order. For example, the parameter function may be defined as in Equation 18 presented below:

$$g(\mathcal{C}_k, \mathcal{C}_{k'}) = 1/\mathrm{mod}(|I+j-1|, K)$$  Equation 18 where i and j indicate alignment indexes of $C_K$ and $C_{K'}$. K is the total number of terminals (or total number of codebooks). For example, when the codebooks are aligned like $\mathcal{C}_2 \to \mathcal{C}_3 \to \mathcal{C}_1 \to \mathcal{C}_6 \to \mathcal{C}_4 \to \mathcal{C}_5$, $\mathcal{C}_5$ and $\mathcal{C}_2$ are the sixth (I=6) and the first (j=1), respectively, $g(\mathcal{C}_5, \mathcal{C}_2) = \infty$.

For example, a multiple-codebook set for MC-PDMA may be formed as shown in table 1 presented above. Referring to table 1 presented above and Equation 16, the codebooks are orthogonal to one another like $\{\mathcal{C}_2, \mathcal{C}_5\}$, $\{\mathcal{C}_1, \mathcal{C}_6\}$, and $\{\mathcal{C}_3, \mathcal{C}_4\}$, such that a reception end can easily detect a signal of a specific terminal when different codebooks are used between adjacent symbols. In the MC-PDMA according to various embodiments, codebooks having a difference in a high diversity order may be allocated as the same multiple codebooks.

3. MC-NOMA Transmission

When transmitting a signal, a terminal may obtain a codeword through modulation based on a codebook and may transmit the corresponding codeword on a radio resource overlapping with signals of other terminals. In the case of existing NOMA, since a unique codebook is used in each terminal, a base station may obtain a signal of the terminal by identifying the codebook of the terminal and identifying a codeword of the codebook. However, in the case of MC-NOMA according to various embodiments of the disclosure, since a plurality of codebooks are used on a plurality of radio resources, configuration information regarding a relationship between a base-terminal resource and a codebook may be signaled or the relationship may be required to be configured in advance. Hereinafter, FIGS. 9 and 10 illustrate operations of a transmission end (for example, a terminal) and a reception end (for example, a base station) of MC-NOMA.

Figure 9:
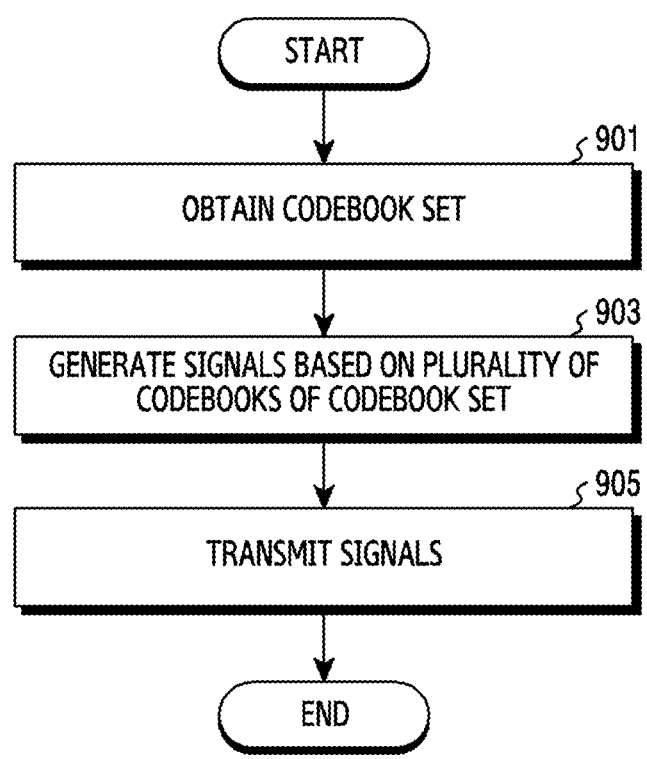
FIG. 9 is a flowchart of an operation of a terminal for MC-NOMA according to various embodiments of the disclosure.
Figure 10:
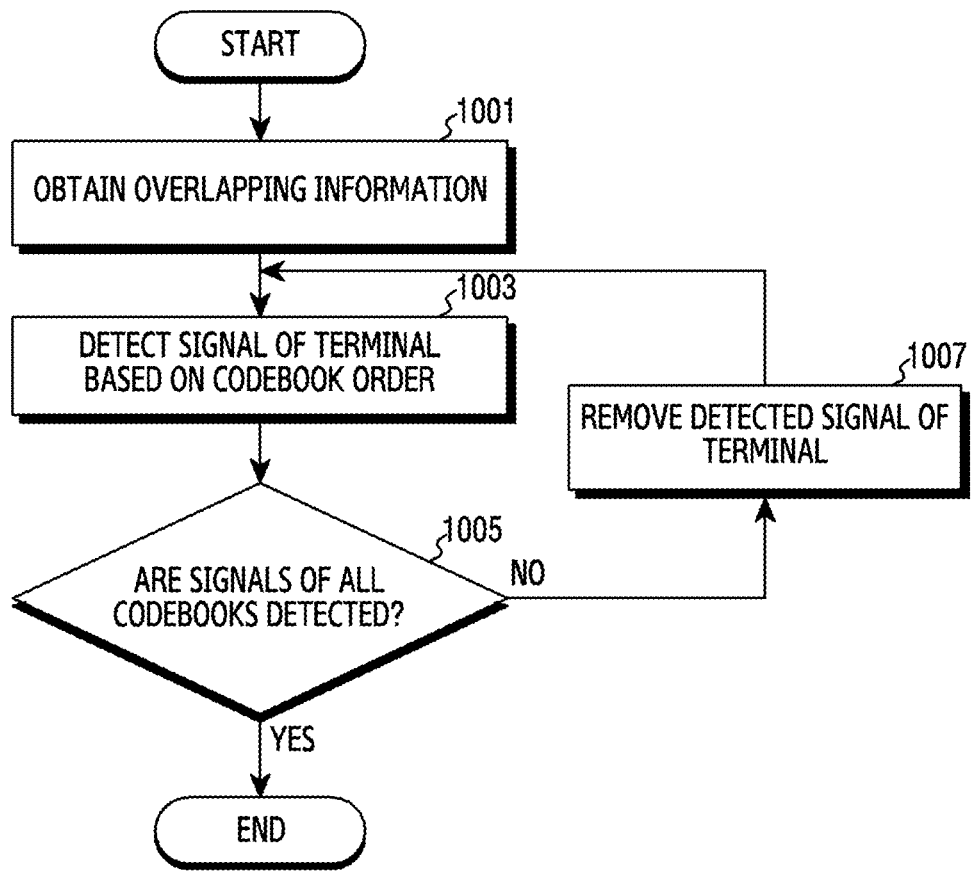
FIG. 10 is a flowchart of an operation of a base station for MC-NOMA according to various embodiments of the disclosure.

FIG. 9 is a flowchart of an operation of a terminal for MC-NOMA according to various embodiments of the disclosure. A case where the terminal is a transmission end of MC-NOMA will be described by way of an example. The terminal is an example of the terminal 120 of FIG. 3. A plurality of terminals may transmit uplink signals to a base station by overlapping the signals on the same resource (for example, a time-frequency resource).

Referring to FIG. 9, at step 901, the terminal may obtain a codebook set. The codebook set may be configured with codebooks of a mother codebook set. A mother codebook set for MC-NOMA may be defined, and the mother codebook set may be a codebook set for terminals grouped to perform MC-NOMA with the terminal, that is, for a group of terminals. The terminals configured to transmit signals while overlapping the signals in the same resource may be defined as one terminal group. According to an embodiment, the base station may transmit information for configuring the mother codebook set to the terminal. The terminal may obtain a codebook set from the mother codebook set, based on information additionally received from the base station or pre-defined rules (for example, random selection, cyclic selection, UE ID-based selection). In addition, according to an embodiment, the mother codebook set may be configured at the base station, and the terminal may receive only information on the codebook set from the base station without information on the mother codebook set.

According to various embodiments, the terminal may receive information for indicating a codebook set from the base station. In some embodiments, the terminal may receive a radio resource control (RRC) message including information for indicating a codebook set from the base station. According to an embodiment, the RRC message may include information indicating one or more codebooks of a codebook set configured for the terminal, among a plurality of pre-defined codebooks. In addition, according to an embodiment, the RRC message may include a bitmap indicating one or more codebooks for the terminal among the plurality of codebooks. A size of the bitmap may be determined based on the total number of the plurality of codebooks. In addition, according to an embodiment, the RRC message may include an index. The index may indicate a codebook set allocated to the terminal. A mapping table regarding the index and the codebook set may be defined. In addition, in some embodiments, the terminal may receive a MAC CE including information for indicating a codebook set from the base station. According to an embodiment, a plurality of codebooks may be configured with the RRC message, and the MAC CE may individually activate/inactivate each of the codebooks. Each terminal may configure one or more codebooks in the codebook set of the terminal, based on the MAC CE. In addition, according to an embodiment, the MAC CE may include an index. The index may indicate a codebook set allocated to the terminal. A mapping table regarding the index and the codebook set may be defined. In addition, in some embodiments, the terminal may receive a DCI including information for indicating a codebook set from the base station. According to an embodiment, a plurality of codebook sets may be configured with an RRC message, and the DCI may indicate a codebook set allowed or allocated to the terminal among the plurality of codebook sets.

At step 903, the terminal may generate signals based on a plurality of codebooks of the codebook set. The terminal may identify one or more codebooks from the codebook set. The codebook may include a plurality of codewords to indicate a modulated symbol, that is, one or more bits of a constellation point. Each codeword may be identified by a specially defined code (for example, MC-SCMA) or a pattern of the code (for example, MC-PDMA). The codebooks of the codebook set may be configured in a defined order, based on a distance metric (for example, a Euclidean distance) between codebooks.

The terminal according to various embodiments may identify radio resources for the plurality of codebooks. In the case of a resource allocation method (for example, FIG. 12, which will be described below), the terminal may identify radio resources for MC-NOMA based on resource allocation information received from the base station. In the case of a grant free method (for example, FIG. 13, which will be described below), the terminal may determine radio resources for MC-NOMA based on a pre-defined method.

In uplink transmission, the radio resources may be divided into one or more resource groups. In the disclosure, the resource group may refer to a unit of resources to which one codebook set is applied. The resource group may be defined based on a codeword length (N) and the number of codeword resources (v). The codeword resource refers to a unit of resources that are set to have different codebooks applied thereto in the resource group. For example, when a length of one codeword is N number of symbols (or subcarriers), the resource group may be defined as a multiple of N. One resource group may include one or more symbols. For example, as shown in FIG. 7, one resource group may include four codeword resources (v=4), and each codeword resource may include four symbols, and accordingly, one resource group may include 16 symbols (REs). Four different codebooks in total may be used during one resource group. In addition, for example, the resource group may include one or more resource blocks. In addition, for example, the resource group may be configured in the unit of a resource block group (RBG).

Codewords of different codebooks may be applied between adjacent codeword resources in the resource group. For example, when the terminal transmits a signal ("00") in a first codeword resource, the terminal may apply a codeword (corresponding to "00") of a first codebook, and, when the terminal transmits a signal ("10") in a second codeword resource adjacent to the first codeword resource, among resources of the same resource group as the first codeword resource, the terminal may apply a codeword ("10") of a second codebook. In this case, another terminal may use a codeword of a codebook different from the first codebook when transmitting a signal in a first resource group. In addition, another terminal may use a codeword of a codebook different from the second codebook when transmitting a signal in a second resource group. That is, the terminal according to various embodiments may generate signals by applying different codebooks in each resource group. According to an embodiment, when the number of codewords ($N_c$) of the terminal is larger than the number of codeword resources (v) in the resource group, the same codebook may be used between different resource groups since the number of codebooks is not infinite.

The terminal may generate signals based on codewords of different codebooks between adjacent codeword resources in the resource group. According to an embodiment, the terminal may generate a first uplink signal to which a codeword of the first codebook is applied and may generate a second uplink signal to which a codeword of the second codebook is applied. The first codebook and the second codebook may be included in the same codebook set. The first uplink signal and the second uplink signal may be transmitted through adjacent codeword resources of the same resource group, respectively.

At step 905, the terminal may transmit the signals to the base station. The terminal may transmit the signals generated at step 903 through radio resources. The corresponding radio resources may be adjacent codeword resources of the same resource group. According to an embodiment, the first codeword resource through which the first uplink signal is transmitted, and the second codeword resource through which the second uplink signal is transmitted may be adjacent resources. For example, the first codeword resource may be adjacent to the second codeword resource in a frequency domain. Signals of adjacent codeword resources (for example, N number of symbols) between terminals may be distinct from one another through respective codewords of the plurality of codebooks.

In addition, the terminal may transmit the signals through the same radio resource as that of another terminal. Herein, transmitting through the same radio resource refers to transmitting through the same time-frequency resource, and refers to signals of respective terminals being transmitted while overlapping one another within a resource grid. That is, even if resources are not orthogonal to one another, signals of different terminals may be distinct from one another through respective codewords of the plurality of codebooks.

FIG. 10 illustrates a flowchart of an operation of a base station for MC-NOMA according to various embodiments of the disclosure. A case where the base station is a reception end of MC-NOMA will be described by way of an example. The base station is an example of the base station 110 of FIG. 2. The base station may receive uplink signals of a plurality of terminals which overlap one another on the same resource (for example, a time-frequency resource).

Referring to FIG. 10, at step 1001, the base station may obtain overlapping information. Herein, the overlapping information may be information indicating whose signals overlap one another among codebooks in what radio resource. Codewords of each codebook may be designed, based on a length of resources for spreading information bits of MC-SCMA or MC-PDMA.

Accordingly, a quantity of radio resources indicated by the overlapping information may be defined based on a length (for example, N=4) of each codeword of the codebook. Since terminals should use different codebooks, the number of codebooks may correspond to the number of terminals sharing radio resources. The overlapping information may be configured in the unit of a terminal group sharing radio resources. That is, the terminal group may include terminals for performing MC-NOMA. That is, the overlapping information may be group specific. For example, the overlapping information may have a form of an indication matrix as shown in Equation 10. In addition, for example, the overlapping information may have a form of a list. In addition, for example, the overlapping information may have a form of a bitmap.

At step 1003, the base station may detect the signals of the terminals based on a codebook order. The base station may determine the codebook order based on the overlapping information. The base station may detect the signals of the terminals from the overlapping signals, based on the codebook order. For example, the base station may perform successive interference cancellation (SIC), based on the overlapping information. The base station may detect the signals of the respective terminals in sequence. In this case, the detection order may be determined based on the codebook order according to the overlapping information.

The base station may obtain at least one of diversity information and interference information, based on the overlapping information. The base station may obtain diversity information based on the overlapping information. The diversity information may indicate how many codebooks a specific codebook is used to transmit within a designated radio resource period, that is, a resource period for MC-NOMA. For example, the diversity information may include a diversity order indicating the number of times that the corresponding codebook is used within the designated radio resource period. The designated radio resource period corresponds to a codeword length, and therefore, may correspond to one codeword resource. For example, in the case of $$V_{PDMA} = \begin{bmatrix} 1 & 0 & 1 & 1 & 1 & 0 \\ 1 & 1 & 0 & 1 & 0 & 1 \\ 1 & 1 & 1 & 0 & 1 & 0 \\ 0 & 1 & 1 & 0 & 0 & 1 \end{bmatrix}$$

in the MC-PDMA (six terminals, four radio resources), a diversity order of three codebooks corresponding to the first column to the third column of the indication matrix may be 3, and a diversity order of the other terminals may be 2. The base station may obtain interference information based on the overlapping information. The interference information may include information related to an interference level by other terminals. For example, the codebook corresponding to the second column may receive less interference than the terminal corresponding to the first column or the third column. This is because signals of other terminals less overlap in the same radio resource.

The base station may determine the codebook order, based on at least one of the diversity information and the interference information based on the overlapping information. For example, considering $$V_{PDMA} = \begin{bmatrix} 1 & 0 & 1 & 1 & 1 & 0 \\ 1 & 1 & 0 & 1 & 0 & 1 \\ 1 & 1 & 1 & 0 & 1 & 0 \\ 0 & 1 & 1 & 0 & 0 & 1 \end{bmatrix}$$

of the MC-PDAM, a signal of a terminal using a codebook corresponding to the second column may be detected first. This is because the diversity order of the codebook corresponding to the second column is highest and the number of interference layers is least.

The base station may enhance performance of SIC by detecting the signal of the terminal of the codebook having the highest diversity order or the signal of the terminal of the codebook having the lowest interference level. For example, when the detection order of the indication matrix is $C_2 \rightarrow C_3 \rightarrow C_1 \rightarrow C_6 \rightarrow C_4 \rightarrow C_5$, the base station may detect signals in order of the terminal using $C_2$ in the corresponding radio resource, the terminal using $C_3$, . . . , and the terminal using $C_5$.

At step 1005, the base station may determine whether signals of all of the codebooks are detected. Herein, all of codebooks refer to entire codebooks configured for the MC-NOMA. The number of all codebooks may correspond to the terminal of terminals for the MC-NOMA. That is, the base station may determine whether signals of all of the codebooks are detected by determining whether signals of all of the terminals are detected. Since the terminal uses a different codebook in each codeword resource, an order of detected terminals may be different in each codeword resource. That is, when detecting the signals of the respective terminals based on the same indication matrix, the base station may detect the terminal using $C_2$ in every codeword resource. For example, in FIG. 11, which will be described below, the base station may detect terminal #5 using $C_2$ in a certain codeword resource, and may detect terminal #6 using $C_2$ in another codeword resource first, respectively. When the signals of all of the codebooks are detected, the base station may finish the detection procedure. When the signals of all of the codebooks are not yet detected, the base station may perform step 1007.

At step 1007, the base station may remove the detected signal of the terminal from the overlapping signal. The overlapping signal may be a received signal or a received signal from which a signal of a specific terminal is removed through previous iteration. The base station may remove the signal of the terminal detected at step 1003 from the overlapping signal through a method of interference removal.

Figure 11:
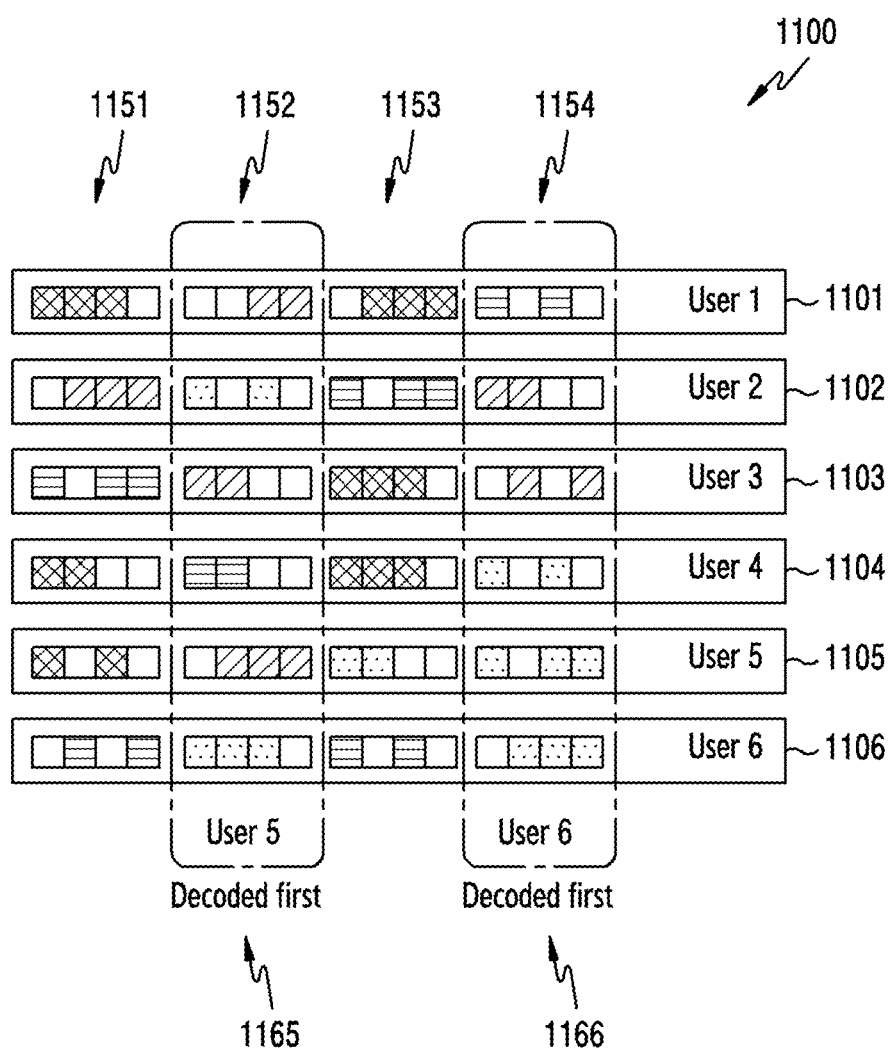
FIG. 11 is a view illustrating an example of MC-NOMA according to various embodiments of the disclosure.

FIG. 11 illustrates an example of MC-NOMA according to various embodiments of the disclosure. FIG. 11 illustrates a case where six terminals transmit signals while overlapping through four radio resources. A resource group includes four codeword resources, and the terminals transmit signals by using different codebooks during each codeword resource. The MC-PDMA of FIG. 6B and Equation 10 will be described by way of an example.

Referring to FIG. 11, the four codeword resources may include a first codeword resource 1151, a second codeword resource 1152, a third codeword resource 1153, and a fourth codeword resource 1154. The six terminals may include a first terminal 1101, a second terminal 1102, a third terminal 1103, a fourth terminal 1104, a fifth terminal 1105, and a sixth terminal 1106.

The first terminal 1101 may use codebooks in order of { $C_1$, $C_6$, $C_2$, $C_5$} in the first codeword resource 1151, the second codeword resource 1152, the third codeword resource 1153, and the fourth codeword resource 1154. The second terminal 1102 may use codebooks in order of { $C_2$, $C_5$, $C_3$, $C_4$} in the first codeword resource 1151, the second codeword resource 1152, the third codeword resource 1153, and the fourth codeword resource 1154. The third terminal 1103 may use codebooks in order of { $C_3$, $C_4$, $C_1$, $C_6$} in the first codeword resource 1151, the second codeword resource 1152, the third codeword resource 1153, and the fourth codeword resource 1154. The fourth terminal 1104 may use codebooks in order of { $C_4$, $C_3$, $C_1$, $C_5$} in the first codeword resource 1151, the second codeword resource 1152, the third codeword resource 1153, and the fourth codeword resource 1154. The fifth terminal 1105 may use codebooks in order of { $C_5$, $C_2$, $C_4$, $C_3$} in the first codeword resource 1151, the second codeword resource 1152, the third codeword resource 1153, and the fourth codeword resource 1154. The sixth terminal 1106 may use codebooks in order of { $C_6$, $C_1$, $C_5$, $C_2$} in the first codeword resource 1151, the second codeword resource 1152, the third codeword resource 1153, and the fourth codeword resource 1154.

The base station may detect a terminal of a codebook that has a high diversity order or a low interference level, first. In this case, since codebooks used in each codeword resource are different according to terminals, the order of terminals detected may be different in each codeword resource. For example, when a codebook detection order is $C_2 \rightarrow C_3 \rightarrow C_1 \rightarrow C_6 \rightarrow C_4 \rightarrow C_5$ according to the indication matrix, $C_2$ may be detected first. Accordingly, in the second codeword resource 1152, the fifth terminal 1105 may be detected first (1165), and in the fourth codeword resource 1154, the sixth terminal 1106 may be detected first (1166). The signals detected in this way are removed from the overlapping signal of each codeword resource.

An error probability depends on channel quality (for example, a signal strength) of each terminal. When L number of channel components are independent, the error probability may be exponentially reduced with respect to L. However, when different codebooks are mapped onto subcarriers including highly correlated channel components like OFDM, the error probability may be reduced less slowly than L. In particular, when a channel of a user to which a codebook having a high diversity order is applied is poor, allocation of the highest transmit diversity does not cause an intended difference from a relative reliability aspect of detection, and thus may reduce overall system performance. That is, determining the detection order based on diversity information is premised on the assumption that higher reliability is provided in signal detection as transmit diversity is higher. From this aspect, in various embodiments, signals are transmitted with different codebooks in a predetermined unit, so that maintenance of low detection performance of a corresponding terminal caused by a specific codebook can be prevented, and an influence on detection of signals of other users/decoding quality can be minimized.

MC-NOMA Configuration Signaling

Figure 12:
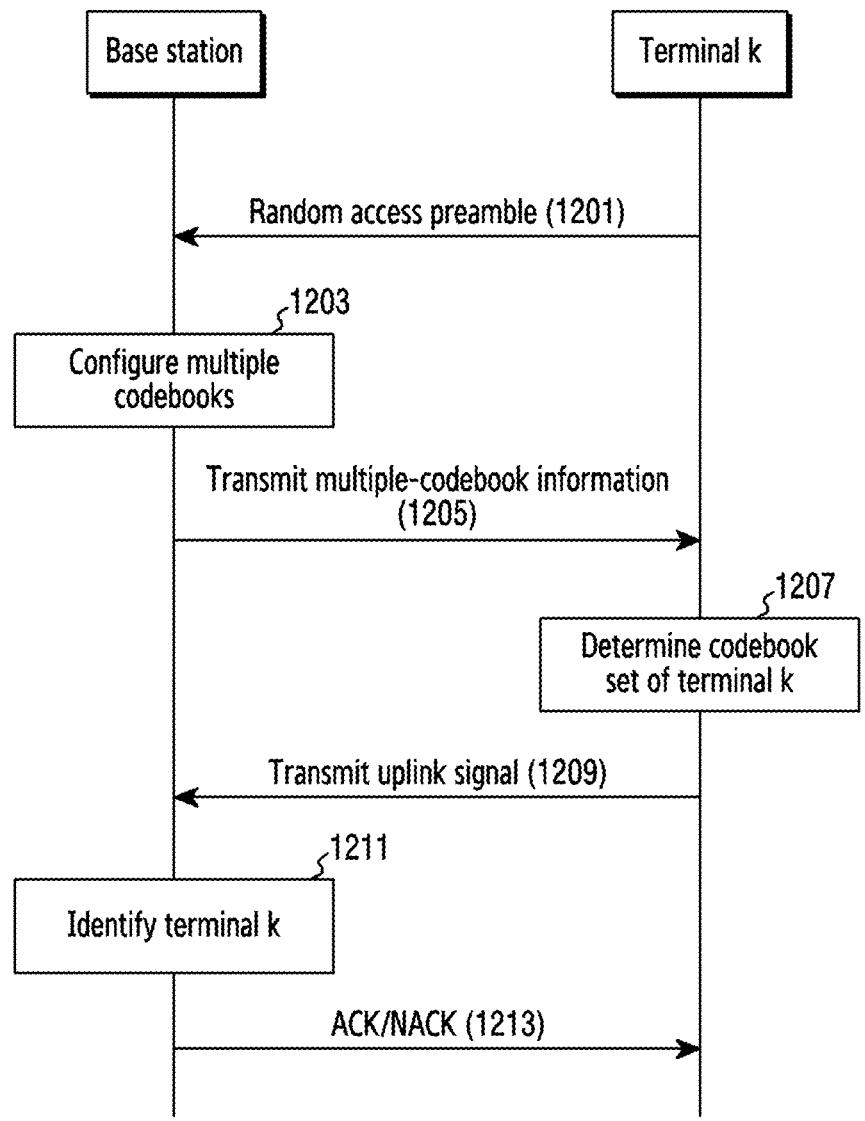
FIG. 12 is a view of a signal flow between a base station and a terminal for MC-NOMA in a resource allocation-based access environment according to various embodiments of the disclosure.
Figure 13:
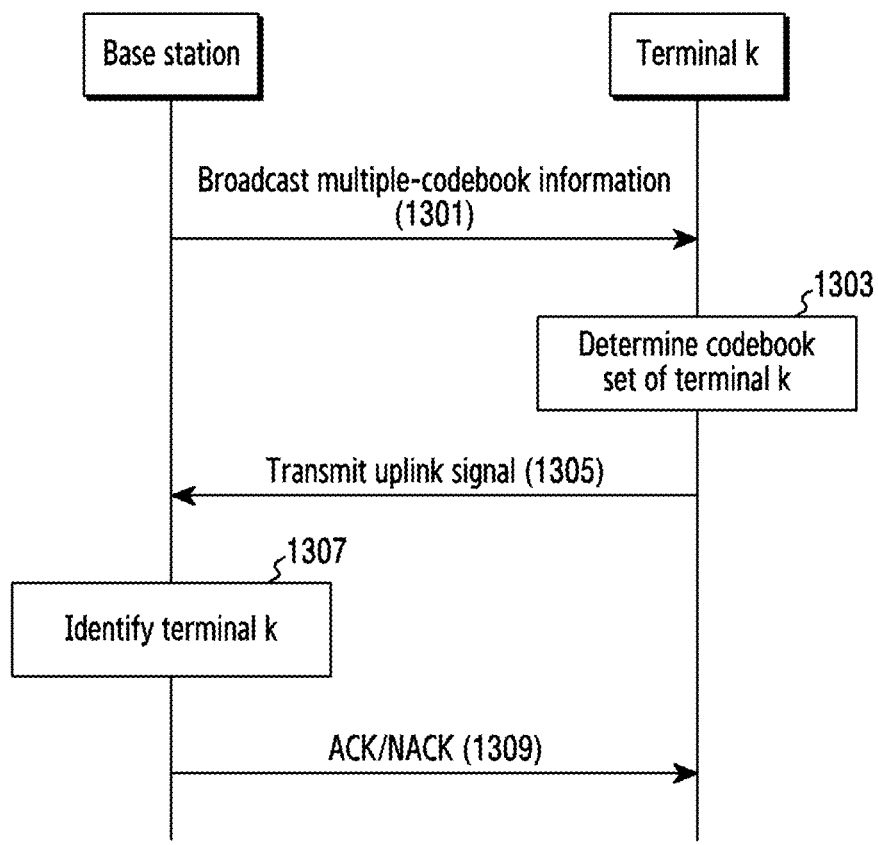
FIG. 13 is a view of a signal flow between a base station and a terminal for MC-NOMA in a grant-free access environment according to various embodiments of the disclosure.

The disclosure suggests two signaling methods as a method for managing multiple codebooks. In some embodiments, a terminal may perform MC-NOMA based on resource allocation from a base station. The terminal may access the base station based on allocated resources. In some other embodiments, the terminal may perform MC-NOMA without being allocated resource by the base station, that is, in a grant-free method. The terminal may access the base station without being allocated resources by the base station. FIGS. 12 and 13 illustrate signaling for configuring MC-NOMA in each access method. FIGS. 12 and 13 illustrate an example of a random access procedure, and signaling of embodiments, which will be described below, may be equally applied to normal uplink data transmission (PUSCH transmission) after RRC connection, in addition to the random access procedure.

FIG. 12 illustrates a signal flow between a base station and a terminal for MC-NOMA in a resource allocation-based access environment according to various embodiments of the disclosure. The base station may be an example of the base station 110 of FIG. 2, and the terminal may be an example of the terminal 120 of FIG. 3. The terminal may be the k-th terminal among K number of terminals in total for MC-NOMA.

Referring to FIG. 12, at step 1201, the terminal may transmit a random access preamble to the base station. The base station may receive the random access preamble from the terminal.

At step 1203, the base station may configure multiple codebooks. The base station may group terminals for MC-NOMA among terminals that try to access. The base station may set K number of terminals to one group and may configure multiple codebooks for the group of terminals. Configurating the multiple codebooks may include configuring a mother codebook set for the terminal group and a codebook set for an individual terminal. First, the base station may determine the mother codebook set, first. The mother codebook set may include a plurality of codebooks. The base station may determine a codebook set for each terminal from the mother codebook set. The codebook set may be a subset of the mother codebook set.

At step 1205, the base station may transmit multiple-codebook configuration information to the terminal. The multiple-codebook configuration information may be information indicating a subset allocated to the terminal in all codebooks, that is, one or more codebooks for the terminal. The multiple-codebook information may include at least one of information (hereinafter, first information) regarding all codebooks (for example, an entirety or a portion of the mother codebook set) for the terminal group for the MC-NOMA, or information (hereinafter, second information) regarding a codebook set for an individual terminal.

The multiple-codebook configuration information may be transmitted to the terminal in various ways. In some embodiments, the base station may transmit the first information on the mother codebook set or a plurality of codebook sets to the terminal, and may transmit the second information regarding a codebook set for the terminal to the terminal. According to an embodiment, the first information may be transmitted by upper layer signaling (for example, RRC), and the second information may be transmitted along with the upper layer signaling or may be transmitted by separate upper layer signaling. For example, the second information may be configured in the form of a list or a bitmap. The terminal may identify a codebook included in the list or indicating "1" (or "0") in the bitmap as being included in the codebook set for the terminal. In another example, the second information may be configured in the form of a start index value. The terminal may configure codebook sets in sequence, based on a start index, from among all codebooks configured in the first information. The terminal may determine a size of the codebook set, based on resources (for example, codeword resources) allocated to the terminal.

According to another embodiment, the first information may be transmitted as system information, and the second information may be transmitted by RRC signaling, MAC CE, or DCI. That is, the first information may be cell-specific, and the second information may be terminal-specific. For example, the system information may be an MIB, an SIB1, or an SIB2. In this case, step 1201 may be performed after step 1203. Terminals in a cell equally share all codebooks for MC-NOMA, and the base station may individually indicate a codebook set for each terminal according to configuration and scheduling of MC-NOMA.

According to still another embodiment, the first information may be transmitted by RRC, and the second information may be transmitted by MAC CE or DCI. The MAC CE or DCI may indicate a subset from among all codebooks indicated by the first information. For example, the MAC CE or DCI may indicate one of indexes regarding a pre-defined subset. In another example, the MAC CE or DCI may indicate whether an individual codebook is activated/inactivated. In this case, since the DCI is DCI for a corresponding terminal, the DCI may be scrambled (or masked) based on UE IE (for example, C-RNTI).

According to yet another embodiment, the first information may be transmitted by RRC signaling, MAC CE or DCI, and the second information may be indicated in a separate method. In this case, the DCI including the first information may be group common DCI for MC-NOMA. The DCI may be scrambled (or masked) based on a group ID (or a group RNTI) for configuring the MC-NOMA. The second information may be implicitly indicated by timing advance (TA), UE ID, already used random access sequence, etc., or may be explicitly indicated through a group ID (or a scrambling ID) of separate RRC signaling.

In addition, in some embodiments, information on the mother codebook set or the plurality of codebook sets may be pre-configured or pre-defined according to standards, and only the second information on the codebook set for the terminal may be transmitted to the terminal. The terminal may identify the codebook set for the terminal, based on the second information, and may transmit signals for the MC-NOMA based on the codebook set. The terminal may identify a codebook set including a designated codebook order based on the second information. According to an embodiment, the second information may be indicated by RRC signaling, MAC CE, or DCI.

At step 1207, the terminal may determine a codebook set for the terminal. The terminal may determine a codebook set for the terminal according to a signaling method according to an embodiment. When resources allocated to the terminal include four codeword-resources, the terminal may determine a codebook set including four codebooks. The terminal may determine a codebook set, based on signaling from the base station or a pre-defined standard (or rule). As described through FIGS. 6A, 6B, 7, and 8, the codebook set for the terminal may be configured so that the same codebook as that of another terminal (for example, the terminal k') is not used in a specific codeword resource. In addition, the codebook set for the terminal may be configured so that the same codebook is not used in adjacent codeword resources.

At step 1209, the terminal may transmit uplink signals to the base station. The terminal may generate uplink signals by using different codebooks in each codeword resource, based on the codebook set. The terminal may transmit the generated uplink signals. The terminal may transmit the uplink signals through each codeword resource.

At step 1211, the base station may identify the terminal. Each terminal configured for the MC-NOMA may transmit uplink signals based on multiple codebook information. The base station may receive the uplink signals from at least two terminals, respectively. In this case, the resources through which the signals of the respective terminals are transmitted may not be orthogonal to one another. That is, even when the signals of the respective terminals are transmitted while overlapping one another in the same time-frequency resource, the base station may separate a signal of a specific terminal through a multi-user detection (MUD) operation. The base station may determine a codebook used in a corresponding terminal, based on multiple-codebook information, and may detect the signals of the terminal from overlapping signals of the plurality of terminals through the determined codebook.

At step 1213, the base station may transmit an ACK or NACK signal to the terminal. The base station may determine whether reception of the signal of the terminal k succeeds through detection and decoding. When the signal of the terminal is successfully received, the base station may transmit ACK to the corresponding terminal. To the contrary, when the signal of the corresponding terminal is not successfully obtained, the base station may transmit NACK to the corresponding terminal. Through an HARQ procedure for transmitting ACK/NACK, communication performance of MC-NOMA can be complemented (for example, a problem that orthogonality between resources is not satisfied or a low channel performance problem caused by a specific codebook can be solved).

Although FIG. 12 illustrates that the codebook configuration information is received after the random access preamble is transmitted, various embodiments of the disclosure are not limited thereto. Before the random access preamble is transmitted, the first information (information on all codebooks) may be received by received system information, and the second information may be received by a downlink signal which is received after the random access preamble. According to an embodiment, the second information may be indicated by a random access response, a separate RRC message, a separate MAC CE or DCI. According to another embodiment, the second information may be indicated by an implicit method (for example, distinguishing according to a TA size, distinguishing according to numerology, distinguishing according to a random access preamble ID).

FIG. 13 illustrates a signal flow between a base station and a terminal for MC-NOMA in a grant-free access network according to various embodiments of the disclosure. The base station may be an example of the base station 110 of FIG. 2, and the terminal may be an example of the terminal 120 of FIG. 3. The terminal may be the k-th terminal from among K number of terminals in total for MC-NOMA.

Referring to FIG. 13, at step 1301, the base station may broadcast multiple-codebook information. Herein, the multiple-codebook information may indicate a union of one or more codebooks set for each terminal. The multiple-codebook information may include all codebooks for terminals to perform MC-NOMA in a cell of the corresponding base station. The base station may broadcast the multiple-codebook information through system information (for example, an MIB, an SIB1). For example, the base station may transmit the multiple-codebook information through a downlink message supported on a physical broadcast channel (PBCH).

At step 1303, the terminal may determine a codebook set for the terminal. The terminal may determine a codebook set for the terminal, from among codebook sets based on the multiple-codebook information. In some embodiments, the terminal may randomly determine a codebook set for the terminal from among the codebook sets. When the terminal randomly selects the codebook set to be applied to each codeword resource, the same codebooks may be used between terminals. In this case, when a signal of a corresponding terminal is not detected due to the use of the same codebooks, the base station may not perform a subsequent procedure (for example, a random access response). In some other embodiments, the terminal may determine a codebook set based on other parameter. According to an embodiment, the terminal may determine a codebook set based on a random access preamble sequence. The terminal generates the random access preamble sequence from a pre-defined set. The terminal may determine a codebook set based on the corresponding sequence. For example, the corresponding sequence may indicate a start codebook in a pre-defined codebook order. In addition, according to an embodiment, the terminal may determine a codebook set based on an SS/PBCH block index. A RACH occasion in which a random access preamble is transmitted may be different according to an SS/PBCH block for feedback.

At step 1305, the terminal may transmit uplink signals to the base station. The terminal may generate uplink signals by using different codebooks in each codeword resource, based on the codebook set. The terminal may transmit the generated uplink signals. The terminal may transmit the uplink signals through each codeword resource. According to an embodiment, the uplink signal may be a random access preamble (or Msg A of a 2-step RACH). In addition, according to an embodiment, the uplink signal may be Msg 3. In addition, according to an embodiment, the uplink signal may be PUCCH transmission or PUSCH transmission.

At step 1307, the base station may identify the terminal. Each terminal configured for the MC-NOMA may transmit uplink signals based on the multiple-codebook information. The base station may receive uplink signals from two or more terminals, respectively. In this case, resources through which the signals of the terminals are transmitted may not be orthogonal to one another. That is, even when the signals of the respective terminals are transmitted while overlapping one another in the same time-frequency resource, the base station may separate a signal of a specific terminal through a multi-user detection (MUD) operation. The base station may determine a codebook used in a corresponding terminal, based on multiple-codebook information, and may detect the signals of the terminal from overlapping signals of the plurality of terminals through the determined codebook.

At step 1309, the base station may transmit an ACK or NACK signal to the terminal. The base station may determine whether reception of the signal of the terminal k succeeds through detection and decoding. When the signal of the terminal is successfully received, the base station may transmit ACK to the corresponding terminal. To the contrary, when the base station does not successfully obtain the signal of the corresponding terminal, the base station may transmit NACK to the corresponding terminal. In the case of a grant-free method, incompleteness caused by non-scheduling can be compensated through such an HARQ procedure. According to an embodiment, a random access response may be transmitted to the terminal instead of ACK, or no response may be transmitted instead of NACK.

Although FIG. 13 illustrates that the multiple-codebook information is broadcasted, embodiments of the disclosure are not limited thereto. In some embodiments, information on all codebooks (that is, the first information) may be pre-configured, and the codebook set for the corresponding terminal may be determined by an individual terminal itself in a grant-free method as at step 1303.

Capability Information Related to MC-NOMA

According to various embodiments, a terminal may generate signals by applying codewords of a different codebook in every designated resource unit. That is, the terminal transmits codewords corresponding to symbol values by using a different codebook in each predetermined resource unit, so that diversity can increase and reception performance can be enhanced even if radio resources are non-orthogonal to one another. In this case, the base station requires a procedure for identifying capability regarding the terminal in order to configure terminals for MC-NOMA. Accordingly, the terminal according to various embodiments may transmit capability information related to MC-NOMA to the base station.

The capability information related to the MC-NOMA may include information of various methods. According to an embodiment, the capability information may include information indicating whether MC-NOMA is supported. In addition, according to an embodiment, the capability information may include information indicating the number of codebooks for MC-NOMA. This is because, when a plurality of codebooks is applied in a frequency domain of a transmission end, a configuration for processing in parallel may be required. In addition, according to an embodiment, the capability information may include information indicating whether all codebooks (for example, a mother codebook set) are included.

MC-NOMA Performance

Performance of MC-NOMA according to various embodiments of the disclosure, and results of simulating based on parameters of table 2 presented below to explain the performance will be described below through FIGS. 14A, 14B, 14C.

TABLE 2

| Parameter | Value | Parameter | Value |
|---|---|---|---|
| $N_b$ | 128 | SNR (dB) | 0:16 |
| $N_c$ | 64 | MPA iterations | 7 |
| N | 4 | The # of IDD iterations | 3 |
| η | 1.5 | Channel coding rate | 1/2 |
| Modulation | QPSK | The # simulation instance | 1000 |

A multiple-codebook set may be formed with respect to both MC-PDMA and MC-SCMA according to table 1, and each terminal transmits a coded bit $N_b$=128 which is mapped onto a codeword $N_c$=64. A system that uses frequency domain resource mapping in OFDM while mapping the codeword $N_c$=64 to $N_c \times N$=256 subcarriers without a loss of generality is assumed. In a simulation, it is assumed that 8 Rayleigh fading paths which are distributed equally AND independently, and a frequency domain channel component are generated. An IDD-based receiver of FIG. 14C is implemented through an MPA provided in a NOMA detector of a front end of the receiver. In addition, in order to model uncertainty of a channel, a channel estimation error (CE) may be configured. For example, the channel estimation error (CE) may be a normalized mean square error defined by a channel vector $h^{(k)}$ and an estimation value ($\hat{h}^{(k)}$), and may be considered as in Equation 19 presented below:

$$CE = \frac{\left\| h^{(k)} - \hat{h}^{(k)} \right\|^2}{\left\| h^{(k)} \right\|^2} \qquad \text{Equation 19}$$

Figure 14A:
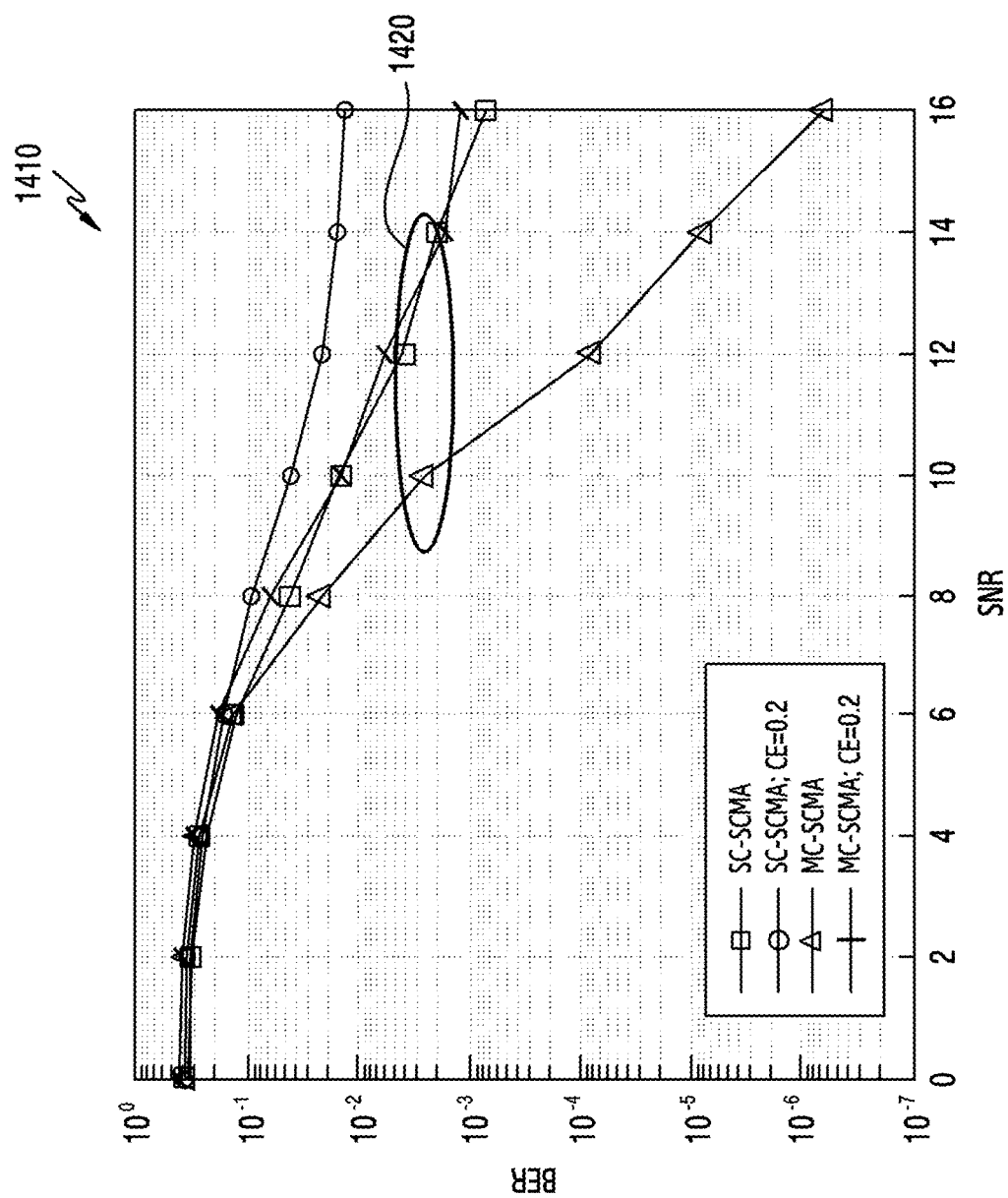
FIG. 14A is a view illustrating an example of a performance graph of MC-SCMA according to various embodiments of the disclosure.

FIG. 14A illustrates an example 1410 of a performance graph of MC-SCMA according to various embodiments of the disclosure. The horizontal axis indicates a signal-to-noise ratio (SNR) and the vertical axis indicates a bit error rate (BER).

Referring to FIG. 14A, the graph 1410 illustrates performance of MC-SCMA, comparing with SC-SCMA. In the case of a normalized mean square channel estimation error, it is identified that MC-SCMA is superior to SC-SCMA both in complete channel estimation and incomplete channel estimation. In particular, referring to an area 1420, it is identified that MC-SCMA achieves a performance gain of 4 dB in complete channel estimation of SNR=10 dB. In addition, even if channel estimation is incomplete (CE=0.2), a BER curve regarding MC-SCMA shows that the BER is rapidly reduced as the SNR increases.

Figure 14B:
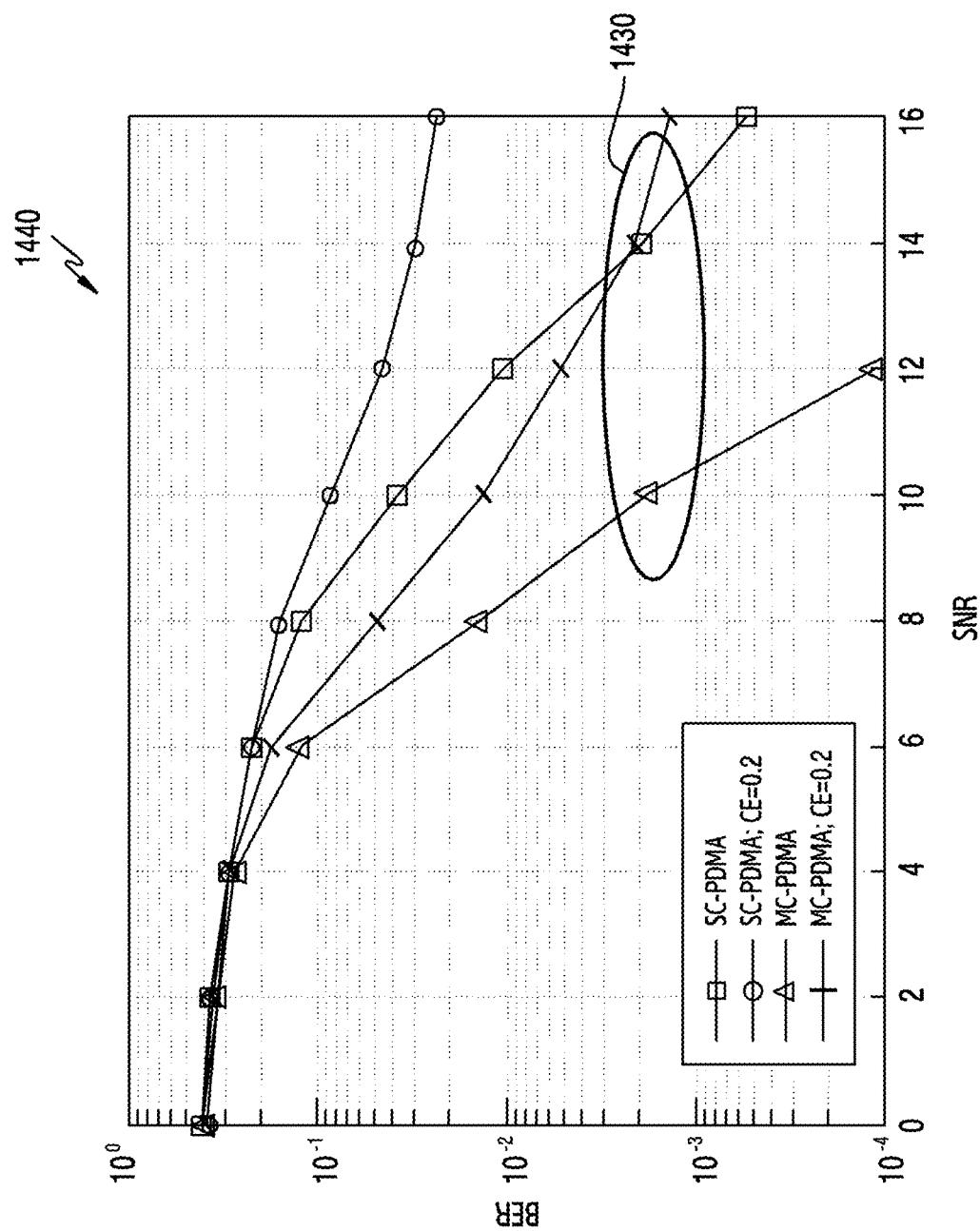
FIG. 14B is a view illustrating an example of a performance graph of MC-PDMA according to various embodiments of the disclosure.

FIG. 14B illustrates an example of a performance graph of MC-PDMA according to various embodiments of the disclosure. The horizontal axis indicates an SNR and the vertical axis indicates a BER.

Referring to FIG. 14B, the graph 1440 illustrates performance of MC-PDMA, comparing with SC-PDMA. In the case of a normalized mean square channel estimation error, it is identified that MC-PDMA is superior to SC-PDMA both in complete channel estimation and incomplete channel estimation. In particular, referring to an area 1430, it is identified that MC-PDMA achieves a gain of 4 Db similarly, compared with SC-PDMA. In addition, it is identified that, compared with MC-SCMA of FIG. 14A, MC-PDMA is excellent in recovering regarding a channel estimation error. This may be explained by the fact that PDMA detection is less susceptible to a phase of a signal and constellation rotation of SCMA is generally susceptible to detection of a phase error. In addition, it is identified that, at a relatively low SNR, MC-PDMA of CE=0.2 surpasses SC-PDMA in complete channel estimation. Enhancement of performance in incomplete channel estimation implies that MC-PDMA is a more effective communication method in a grant-free access scenario described in FIG. 13 than SC-PDMA.

Figure 14C:
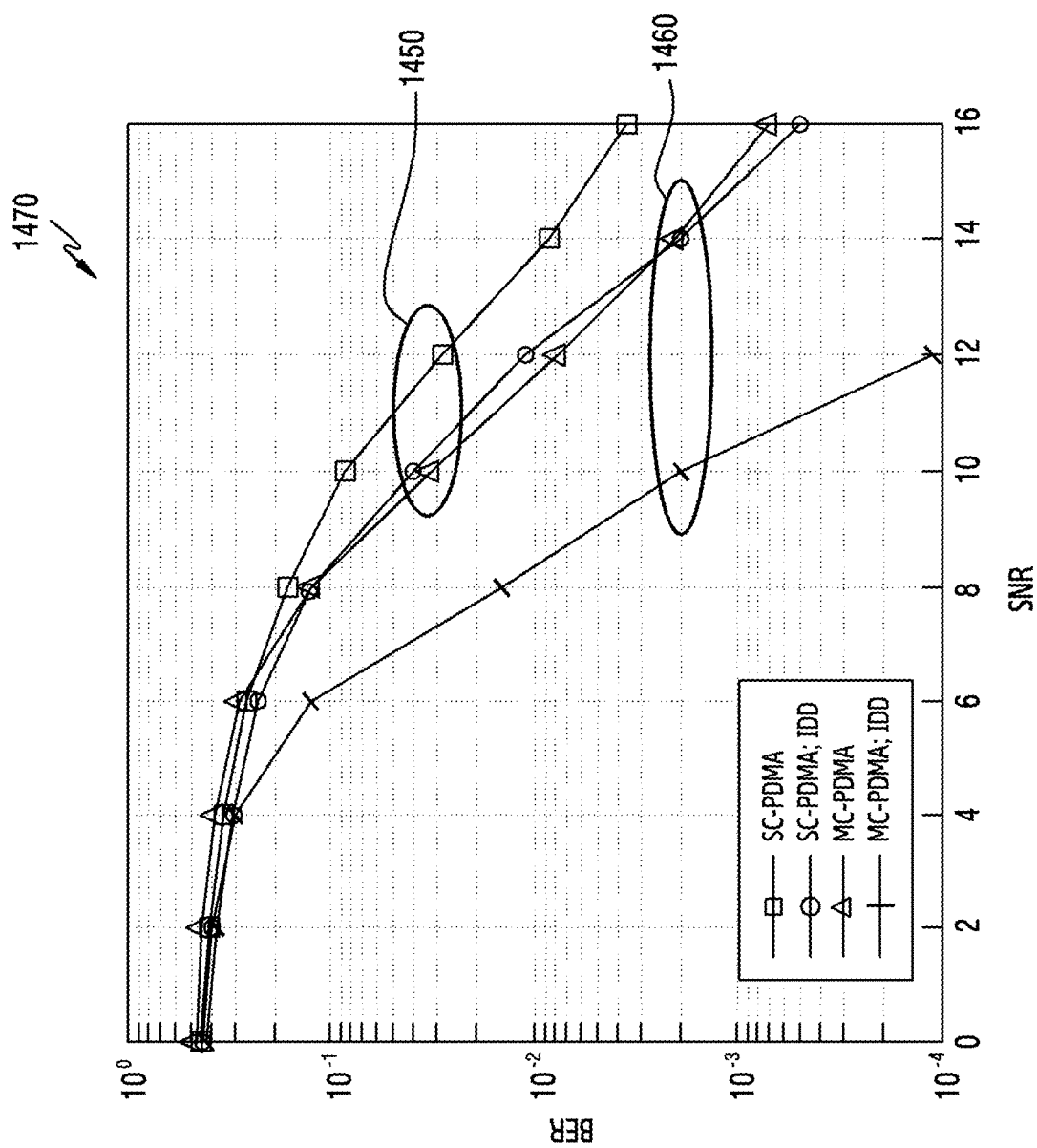
FIG. 14C is a view illustrating an example of a performance graph according to iterative detection and decoding (IDD) of MC-NOMA according to various embodiments of the disclosure.

FIG. 14C illustrates an example of a performance graph according to IDD of MC-NOMA according to various embodiments of the disclosure. The horizontal axis indicates an SNR and the vertical axis indicates a BER.

Referring to FIG. 14C, the graph 1470 indicates how MC-NOMA increases advantages of IDD further than SC-NOMA. Herein, performance of SC-PDMA and MC-PDMA regarding IDD detection and single shot detection, respectively, are suggested. Referring to an area 1450, it is identified that the single shot detection of MC-PDMA achieves 2 dB gain compared to the single shot detection of SC-PDMA. Referring to an area 1460, it is identified that the IDD detection of MC-PDMA can achieve 4 dB gain compared to the IDD detection of SC-PDMA. In addition, in a predetermined SNR area, the single shot detection of MC-PDMA shows higher performance than the IDD detection of SC-PDMA. The results of this comparison mean that the IDD detection in NOMA is more effective than in MC-NOMA.

As described above, in the case of a related-art codebook-based NOMA method using only a single codebook, channel and interference diversity is not used in communication between a base station and a terminal, and therefore, a unfavorable channel condition may continue due to the single codebook. Accordingly, various embodiments of the disclosure suggest a multiple codebooks-based NOMA method using a plurality of codebooks, that is, an MC-NOMA method. In the disclosure, examples of using a plurality of codebooks in a round robin manner have been mainly described, but various embodiments of the disclosure are not limited thereto. That is, the codeword resource is not a fixed value and may be adaptively configured according to a channel condition. According to an embodiment, the terminal may use a codebook identified according to an instantaneous channel condition (for example, a data rate) from among the plurality of codebooks. In addition, according to an embodiment, the terminal may use a codebook identified from the plurality of codebooks based on a PF algorithm.

Various embodiments of the disclosure can provide enhancement of MC-NOMA without causing additional receiver complexity and a loss in spectrum efficiency. In particular, in a scenario such as a grant-free access which does not guarantee complete channel estimation, MC-NOMA may be more flexible to a channel estimation error. This is because each terminal (or a base station) can transmit/receive signals more robustly to a channel condition through a plurality of codebooks. In addition, the plurality of codebooks is allocated to the terminals for transmission, so that a channel condition of each terminal can be adaptively enhanced through channel and interference diversity.

Although various parameters such as a signal strength, an SNR, etc. are described as channel quality in the disclosure, the channel quality in the respective embodiments of the disclosure may be indicated by reference signal received power (RSRP), beam reference signal received power (BRSRP), reference signal received quality (RSRQ), received signal strength indicator (RSSI), signal to interference and noise ratio (SINR), carrier to interference and noise ratio (CINR), error vector magnitude (EVM), bit error rate (BER), block error rate (BLER), other terms having the same technical meanings as those described above, or metrics indicating channel quality.

Various embodiments of the disclosure describe the case where terminals transmit uplink signals by using different codebooks by way of an example, but can be equally applied to downlink NOMA in which a base station transmits signals to a plurality of terminals while overlapping the signals.

The apparatus and the method according to various embodiments of the disclosure enable more robust communication even in a poor channel condition by using a plurality of codebooks during a transmission period.

The effect achieved by the disclosure is not limited to those mentioned above, and other effects that are not mentioned above may be clearly understood to those skilled in the art based on the description provided above.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, for a non-orthogonal multiple access (NOMA), from a base station, first information related to an entire codebook set for a plurality of terminals;

receiving, for the NOMA, from the base station, second information indicating a codebook set for the terminal that is a subset of the entire codebook set for the plurality of terminals;

generating uplink signals by using a plurality of codebooks of the codebook set for the terminal; and transmitting the uplink signals to a base station, wherein a first uplink signal of a first resource among the uplink signals is generated based on a first codeword of a first codebook among the plurality of codebooks, wherein a second uplink signal of a second resource adjacent to the first resource among the uplink signals is generated based on a second codeword of a second codebook that is different from the first codebook among the plurality of codebooks, wherein the first information is indicated by a radio resource control (RRC) signaling, wherein the second information is indicated by a medium access control (MAC) control element (CE) or downlink control information (DCI), wherein the first resource comprises N number of subcarriers in a frequency domain, wherein the second resource comprises N number of other subcarriers adjacent to the N number of subcarriers, and wherein the N corresponds to a number of resource elements (REs) to which a code of the codebook applies.

2. The method of claim 1, wherein the second codebook is a codebook that has a distance metric with the first codebook in the codebook set for the terminal, and wherein the distance metric comprises a minimum Euclidean distance of an adjacent constellation.

3. The method of claim 1, wherein:

the codebook set for the terminal comprises codebooks, each of the codebooks comprises a code for a sparse code multiple access (SCMA) or a pattern division multiple access (PDMA) according to each of the first codeword and the second codeword, and the code is configured to spread information bits during a radio resource period of a predetermined length.

4. The method of claim 1, further comprising:

receiving, from the base station, first information related to an entire codebook set for the plurality of terminals; and obtaining the codebook set for the terminal among the entire codebook set for the plurality of terminals based on a predetermined rule, wherein the predetermined rule comprises one of a random selection, cyclic selection or user equipment (UE) identity-based selection.

5. The method of claim 1, wherein the second information indicates the codebook set for the terminal based on one of a timing advance (TA) size, numerology or random access preamble identity.

6. A method performed by a base station in a wireless communication system, the method comprising:

obtaining an entire codebook set for a plurality of terminals;

transmitting, for a non-orthogonal multiple access (NOMA), to a terminal, first information related to the entire codebook set for the plurality of terminals;

transmitting, for the NOMA, to the terminal, second information indicating a codebook set for the terminal that is a subset of the entire codebook set for the plurality of terminals;

receiving a first overlapping signal in which signals of the plurality of terminals overlap one another in a first resource;

receiving a second overlapping signal in which the signals of the plurality of terminals overlap one another in a second resource;

detecting a first uplink signal of the terminal in the first resource based on the codebook set for the terminal; and detecting a second uplink signal of the terminal in the second resource adjacent to the first resource based on the codebook set for the terminal, wherein the codebook set for the terminal comprises a plurality of codebooks in the entire codebook set for the plurality of terminals, wherein the first uplink signal is generated based on a first codeword of a first codebook among the plurality of codebooks, and wherein the second uplink signal of the second resource is generated based on a second codeword of a second codebook that is different from the first codebook among the plurality of codebooks.

7. The method of claim 6, wherein:

the first information is indicated by a radio resource control (RRC) signaling, the second information is indicated by a medium access control (MAC) control element (CE) or downlink control information (DCI), the first resource comprises N number of subcarriers in a frequency domain, the second resource comprises N number of other subcarriers adjacent to the N number of subcarriers, and the N corresponds to a number of resource elements (REs) to which a code of the codebook applies.

8. The method of claim 6, wherein the second codebook is a codebook that has a distance metric with the first codebook in the codebook set for the terminal, and wherein the distance metric comprises a minimum Euclidean distance of an adjacent constellation.

9. The method of claim 6, wherein:

the codebook set for the terminal comprises codebooks, each of the codebooks comprises a code for a sparse code multiple access (SCMA) or a pattern division multiple access (PDMA) according to each of the first codeword and the second codeword, and the code is configured to spread information bits during a radio resource period of a predetermined length.

10. The method of claim 6, further comprising:

obtaining overlapping information for the plurality of terminals based on the entire codebook set for the plurality of terminals, identifying a codebook order based on the overlapping information, performing successive interference cancellation (SIC) based on the codebook order, wherein the overlapping information comprises at least one of diversity information or interference information.

11. A terminal in a wireless communication system, the terminal comprising:

a transceiver; and at least one processor coupled with the transceiver, wherein the at least one processor is configured to:

receive, for a non-orthogonal multiple access (NOMA), from a base station, first information related to an entire codebook set for a plurality of terminals;

receive, for the NOMA, from the base station, second information indicating a codebook set for the terminal that is a subset of the entire codebook set for the plurality of terminals;

generate uplink signals by using a plurality of codebooks of the codebook set for the terminal; and control the transceiver to transmit the uplink signals to a base station, wherein a first uplink signal of a first resource among the uplink signals is generated based on a first codeword of a first codebook among the plurality of codebooks, wherein a second uplink signal of a second resource adjacent to the first resource among the uplink signals is generated based on a second codeword of a second codebook that is different from the first codebook among the plurality of codebooks, wherein the first information is indicated by a radio resource control (RRC) signaling, wherein the second information is indicated by a medium access control (MAC) control element (CE) or downlink control information (DCI), wherein the first resource comprises N number of subcarriers in a frequency domain, wherein the second resource comprises N number of other subcarriers adjacent to the N number of subcarriers, and wherein the N corresponds to a number of resource elements (REs) to which a code of the codebook applies.

12. The terminal of claim 11, wherein the second codebook is a codebook that has a distance metric with the first codebook in the codebook set for the terminal, and wherein the distance metric comprises a minimum Euclidean distance of an adjacent constellation.

13. The terminal of claim 11, wherein:

the codebook set for the terminal comprises codebooks, each of the codebooks comprises a code for a sparse code multiple access (SCMA) or a pattern division multiple access (PDMA) according to each of the first codeword and the second codeword, and the code is configured to spread information bits during a radio resource period of a predetermined length.

14. The terminal of claim 11, wherein the at least one processor is further configured to:

receive, from the base station, first information related to the entire codebook set for the plurality of terminals, and obtain the codebook set for the terminal among the entire codebook set for the plurality of terminals based on a predetermined rule, wherein the predetermined rule comprises one of a random selection, cyclic selection or user equipment (UE) identity-based selection.

15. The terminal of claim 11, wherein the second information indicates the codebook set for the terminal based on one of a timing advance (TA) size, numerology or random access preamble identity.

* * * * *